(12) United States Patent
Tao et al.

(10) Patent No.: US 8,011,650 B2
(45) Date of Patent: Sep. 6, 2011

(54) IMAGE FORMING APPARATUS USING SHEET POST-PROCESSING INFORMATION

(75) Inventors: Kozo Tao, Osaka (JP); Hiroki Saito, Himeji (JP)

(73) Assignee: Kyocera Mita Corporation, Osaka (JP)

( * ) Notice: Subject to any disclaimer, the term of this patent is extended or adjusted under 35 U.S.C. 154(b) by 1150 days.

(21) Appl. No.: 11/447,217

(22) Filed: Jun. 6, 2006

(65) Prior Publication Data

US 2007/0057426 A1 Mar. 15, 2007

(30) Foreign Application Priority Data

Sep. 14, 2005 (JP) ................................ 2005-266156
Sep. 26, 2005 (JP) ................................ 2005-277205
Oct. 4, 2005 (JP) ................................ 2005-290672

(51) Int. Cl.
*B65H 37/04* (2006.01)

(52) U.S. Cl. ............... 270/58.09; 270/58.07; 270/58.08; 270/58.11; 399/407; 399/408; 399/410

(58) Field of Classification Search ............... 270/58.07, 270/58.08, 58.09, 58.11; 399/407, 408, 410
See application file for complete search history.

(56) References Cited

U.S. PATENT DOCUMENTS

| | | | | |
|---|---|---|---|---|
| 4,763,167 A | * | 8/1988 | Watanabe et al. | 347/155 |
| 5,508,798 A | * | 4/1996 | Yamada | 399/410 |
| 5,551,679 A | * | 9/1996 | Yoshida et al. | 270/58.09 |
| 6,711,365 B2 | * | 3/2004 | Ohtani | 399/82 |

FOREIGN PATENT DOCUMENTS

| | | |
|---|---|---|
| JP | 2002-232677 | 8/2002 |
| JP | 2002-241041 | 8/2002 |
| JP | 2003-050482 | 2/2003 |
| JP | 2003-266806 | 9/2003 |

* cited by examiner

*Primary Examiner* — Leslie A Nicholson, III
(74) *Attorney, Agent, or Firm* — Browdy and Neimark, PLLC

(57) ABSTRACT

There is set sheet post-processing (SPP) information having a post-processing-edge (PPE) code, a staple code and a punch code. When the staple code indicates one end of the PPE and the PPE is rotated towards the one end by 90° with respect to the center of the sheet, the SPP code is updated, and the staple code SC is updated to indicate the other end of the PPE. Referring to a table, it is checked if the present SPP information indicates that SPP is inhibited or an error. When determined as an error, it is judged if the PPE can be changed to the neighboring edge with removing the error. In an affirmative judgment, the error is automatically removed with the PPE being changed to the neighboring edge together with changing the SPP position and an image being rotated by 90°.

36 Claims, 39 Drawing Sheets

*Fig.3*

POST-PROESSING INFORMATION

| PST-PRCSSNG EDGE ID | STAPLE POSITION ID | PUNCH CODE | BINDING MRGN (mm) | SHEET SIZE |
|---|---|---|---|---|
| EC | SC | PC | 10 | A4R |

0~4      0~3      0~2

COPY BEFORE UPDATING

| BINDING MARGIN ID |
|---|
| EC0 |

Fig.4

| No. | CONDITION | | CONTETNS OF SETTING ERROR |
|---|---|---|---|
| | SHEET SIZE AND POST-PROCESSING EDGE | PC | |
| 1 | LetterL, B5L | 1 | TWO-HOLE PUNCHING INHIBITION |
| 2 | A4S, B5L | 2 | FOUR-HOLE PUNCHING INHIBITION |
| 3 | B4L | any | TRANSVERSE TRANSFER INHIBITION |

SC = 0    SC = 1    SC = 2    SC = 3

(A) EC = 0, SC = 2

(B) EC = 1, SC = 0

(A) EC = 1, SC = 0

(B) EC = 0, SC = 2

(A) EC = 1, SC = 2

(B) EC = 2, SC = 0

EC = 0    EC = 1    EC = 2    EC = 3    EC = 4

MIXED MODE OF SHEET
SIZES IS NOT AVAILABLE.

*pior art*

(A)

(B)

IMAGE FORMING APPARATUS USING SHEET POST-PROCESSING INFORMATION

BACKGROUND OF THE INVENTION

1. Field of the Invention

The present invention relates to an image forming apparatus for forming an image on a sheet with feeding the sheet, such as a printer, a copier, a facsimile machine or a multifunction machine, and more particularly, to an image forming apparatus suitable for post-processing sheets such as stapling or punching sheets with using sheet post-processing information of edge and position identifying code.

2. Description of the Related Art

In either of Japanese Patent Application Publication No. 2002-241041 and No. 2003-266806, as shown in FIG. 34(A) for example, one edge of a sheet 1 is designated as a sheet binding margin 2, and an image on the back side of a sheet is rotated by 180° when a sheet feed direction is perpendicular to a sheet turning-over direction. In either of these publications, as shown in FIG. 35(A) for example, one edge of the sheet 1 is designated as the sheet binding margin 2, and sheet turning-over direction is determined on the basis of the sheet binding margin 2. On the other hand, since a sheet post-processing apparatus is configured to post-process sheets after aligning either a front end or a rear end of a stack of sheets in a sheet feed direction, a sheet feeding tray should be used wherein sheets are set so that either the front end or the rear end in the sheet feed direction is to be the sheet binding margin.

In a case of a sheet size, A4 size for example, where a longitudinal transfer (a transfer in which a short edge is perpendicular to the sheet feed direction) and a transverse transfer are selectable, the transverse transfer has a better printing efficiency.

(A) Problems Resulting from a Transfer Direction Determined on the Basis of a Sheet Binding Margin However, in the prior art, as shown in FIG. 34(A), in a case where the sheet binding margin 2 is designated, although a stapling is executed on one end of the sheet binding margin 2 as shown in FIG. 34(B), the transverse transfer cannot be made, thereby causing the problem that the printing efficiency is deteriorated.

Conversely, when a transverse-transfer sheet is not set in a sheet feeding tray and a long edge of the sheet is designated as the sheet binding margin 2, there has been a problem that a printing is impossible.

In addition, for example, in a case where a sheet size is B4 and an image forming apparatus does not able to feed B4 sized sheet in transverse transfer, for a sheet binding margin 2 in FIG. 35(A), as shown in FIG. 35(B) for example, even in a case where one end of the sheet binding margin 2 is to be stapled, since the direction of transfer is determined by the sheet binding margin 2, there has been a problem that it is impossible to change to the longitudinal transfer as described above.

Furthermore, in a case shown in FIG. 34(B) for example, a stapling apparatus staples sheets on left end of the sheet binding margin, however, even if the longitudinal transfer is changed to the transverse transfer, the sheet post-processing is executed on the left end, thereby causing a problem that an unwanted finishing is made as shown in FIG. 34 (C).

In addition, in a case where both of the sheet staple-processing and punch-processing are to be executed in a single printing job, the respective data of each has no relation with each other, thereby causing the same problem when the sheet feed direction is changed.

Moreover, as shown in FIG. 3 of the Japanese Patent Application Publication No. 2002-241041, since a lot of binding position information on the sheet is used, many steps to sort the information should be executed, thereby causing a problem that a processing becomes complex.

(B) New Technical Problems Resulting from Solving the Above Problems

The present inventors have found that the problems can be solved by introducing the concept of a 'post-processing-edge' aside form the sheet binding margin. In this case, since the user's operability is greatly affected by how to process a setting error by a relationship with the post-processing-edge, the processing of the setting error becomes an important technical problem.

(C) Problems of a Sheet Punch-Processing in a Mixed Mode of Sheets with Different Sizes Japanese Patent Application Publication No. 2002-232677 discloses a configuration in which sheet binding margin positions are aligned in a mixed mode of sheets with two different sizes in a single printing job.

For example, in a case of using A4 longitudinal and A3 transverse sheets, a first sheet to be printed is A4 and the long edge thereof is designated as the sheet binding margin, and for A3 sheets from the second sheet, the short edge of the A3 is designated as the sheet binding margin together with changing the information indicating the direction of an image by rotating by 90°, etc., relative to the image information (see FIG. 5 of the publication above). However, if the short edge of a large sized sheet and the long edge of a small sized sheet are different to each other, the mixed mode of the different sized sheets can not be applied thereto.

Meanwhile, since the sheet punching apparatus can form punch holes on one sheet after another, in the mixed mode of the different sized sheets, it is possible to overlap and discharge the sheets after forming the punch holes on both the A4 transverse-transfer sheet and the B5 longitudinal-transfer sheet as shown in FIG. 36.

That is, in the prior art, the capability of the sheet post-processing apparatus has not been sufficiently utilized.

Here, it is troublesome to separately set a sheet binding margin for each of the sheets with different sizes. In addition, if the punch holes are set on one sized sheet but the punch holes are inhibited from being set on the other sized sheet, setting the punch holes on the one sized sheet becomes useless, or since the punch holes are formed only on the one sized sheet, user's intention can not be achieved.

(D) Problems of Sheet Staple-Processing in a Double-Sided Printing Mode when Sheets with Different Sizes are Mixed FIG. 37 shows a case where the double-sided printing is executed by using the sheets with different sizes in a single printing job and a stack of sheets is fixed with a staple.

Under the condition of binding the sheets with different sizes by arranging equilaterals among them, if a short edge binding is designated, as shown in FIG. 37(A), for the small size sheet the sheet binding margin 1 becomes parallel to the sheet feed direction. In contrast, for the large size sheet, as shown in FIG. 37 (D), the sheet binding margin 2 becomes perpendicular to the sheet feed direction. Thereby, each of the small size and large size sheets is turned-over by being rotated around the sheet binding margins 1 and 2 and the sheet turning-over directions of the sheets become thus different by 90° to each other so that a staple 3 should be driven in the common area of the sheet binding margins 1 and 2 as shown in FIG. 37 (G).

FIGS. 37(B) and (E) show directions of images printed on the back sides of sheets in (A) and (D), respectively. FIGS.

37(C) and (F) show, with dotted line, the images on the back sides of sheets in (A) and (D), respectively.

As above, since the situation occurs that the sheet turning-over directions are different by 90° in the small size and the large size sheets, it can not meet user's demand that the sheet turning-over directions should be identical regardless of sizes.

In addition, as disclosed in Japanese Patent Application Publication No. 2002-232677 in the case of making the sheet binding margin by arranging equilaterals among the sheets with different sizes, as shown in FIG. 22 (C), the stack of sheets should be rotated by 90° by replacing the small size and the large size sheets. Therefore, it can not meet user's demand that the sheet turning-over directions should be identical without rotating the stack of sheets.

Meanwhile, since the sheet post-processing apparatus mounted on the image forming apparatus executes the sheet post-processing on either of the front end or the rear end of the sheet feeding direction of a sheet, for example, the sheet binding margin 1 in FIG. 37 should be the front end of the sheet feed direction, and in the case of FIG. 37, since the length of edge of a sheet can not be arranged as the front end of the sheet feeding direction, the sheet post-processing can not be executed.

(E) Problems in the Relation Between Image Forming Direction and Set Condition for the Sheet Feeding Tray of a Special Sheet where a Pre-Processing is Executed There are cases to form an image on a special sheet where a pre-processing is executed so that the direction of the image to be formed should be set, such as a pre-punched sheet where holes have previously been perforated and a pre-printed sheet (including a letter head sheet) where an image such as a rule or a items listing blank, etc., has previously been formed.

In a single printing job for such a special sheet, in the case where a double-sided printing and a single-sided printing are mixed, Japanese Patent Application Publication No. 2005-174711 filed by the present applicant executes processes as described below. That is, in the case where the double-sided printing is executed by the image forming apparatus, it first forms an image on the back side and then forms a front side image by reversing the special sheet and discharges the sheet to a face down sheet discharge tray. In the case of the single-sided printing, it inserts blank sheet image information on a back side dummy page and executes the double-sided printing but at the same time, the back side should not be counted.

Thereby, for example, in the case where the images on the first, second, fourth and fifth pages are formed by the double-sided printing, and the image on the third page is formed by the single-sided printing, the images are formed in a desired order as shown in FIG. 38, thereby solving the problem of the apparatus that the sheet must pass through a printer engine three times to perform the double-sided printing described in Japanese Patent Application Publication No. 2003-050482.

Here, if the special sheet is stapling processed with a finisher, for the reason associated with a mechanism, the special sheet should be usually fed so that a sheet staple-processing edge should be the front end of the sheet feed direction. Meanwhile, there is a case where front and back sides of the special sheet are reversed to be set in the sheet feeding tray. For example, since the directions to be turned over become opposite depending on a vertical writing and horizontal writing, there is a need to set the front and back sides reversed.

FIG. 39(A) schematically shows a duplex pre-printed sheet as the special sheet. As shown in the drawing, in the case where the direction of the image to be formed (the direction of the pre-printed image) is perpendicular to the sheet feed direction, if the front and back sides of the special sheet are reversed so that the sheet staple-processing edge should be the front end of the sheet feed direction, the image is in a state whereby it is rotated by 180° as shown in FIG. 39(B) and the image forming apparatus needs to make the image which is formed to rotate by 180°.

The conventional image forming apparatus, regardless of a rotating reason, comprises a (general) simple setting function to rotate the image by 180°, however, it must have been considered to be set in order to certainly and correctly rotate the image by 180° depending on the set condition of the special sheet by a user.

SUMMARY OF THE INVENTION

It is an object of the present invention to provide an image forming apparatus capable of automatically changing the direction of transfer according to given conditions without complicating the user's setting of sheet post-processing, in a case of using sheets of a size capable of a longitudinal transfer and a transverse transfer.

It is another object of the present invention to provide an image forming apparatus capable of preventing a sheet post-processing from being executed against user's intention, by coupling data of a plurality of sheet post-processings when executing them, even if the sheet feed direction is changed.

It is yet another object of the present invention to provide an image forming apparatus capable of making sheet post-processing routine more simplify by reducing the number of sheet post-processing patterns.

It is still another object of the present invention to provide an image forming apparatus capable of executing error processing in relation with the concept of post-processing-edge, which is newly introduced by the present inventors.

It is a yet still another object of the present invention to provide an information processing device and an image forming apparatus comprising the same capable of improving operability by automatically removing errors, even though they are judged to be setting errors when setting sheet post-processing information.

It is a yet still another object of the present invention to provide an image forming apparatus capable of executing a sheet post-processing after forming an image, even though a plurality of sheets of different sizes have no edge whose length is equal to each other, in a single image forming job.

It is yet still another object of the present invention to provide an image forming apparatus capable of automatically determining a sheet turning-over direction coinciding with user's intention, in accordance with user's designation of a combination of a post-processing-edge and a sheet binding margin.

It is yet still another object of the present invention to provide an image forming apparatus capable of forming an image on a special sheet without generating an image rotation error.

An image forming apparatus according to a first aspect of the present invention comprises: image forming means for forming an image on a sheet fed thereto; sheet post-processing means for physically executing sheet post-processing on the sheet on which the image is formed by the image forming means; setting means for setting sheet post-processing information including: post-processing-edge identifying information identifying a post-processing-edge of the sheet with respect to a longitudinal or a transverse sheet direction; and sheet post-processing-position identifying information identifying a sheet post-processing-position on the post-processing-edge; storage means for storing image information and the information set with the setting means; and control means for making the image forming means form the image on the sheet on the basis of the image information and the sheet post-processing information, and making the sheet post-processing means execute the sheet post-processing on the basis of the sheet post-processing information.

According to the first aspect, since the sheet post-processing identifying information for identifying the sheet post-processing-position for the post-processing-edge is used, even when a plurality of sheet post-processing apparatuses are used, their sheet post-processing-position identifying information is coupled, thereby preventing the execution of a sheet post-processing that the user does not intend, even though the sheet feed direction is changed.

In addition, the sheet post-processing-position identifying information for identifying the sheet post-processing-position for the post-processing-edge is used, resulting in that the sheet post-processing routine can be more simplified with greatly reducing the number of sheet post-processing patterns than that of the prior art.

In the image forming apparatus according to a second aspect of the present invention based on the first aspect, wherein in a case of the sheet post-processing-position identifying information indicating one of the both ends of the post-processing-edge, when rotating the post-processing-edge towards the one end by 90° substantially with respect to the center of the sheet, the control means updates the post-processing-edge identifying information corresponding to the 90° rotation and updates the sheet post-processing-position identifying information so that the sheet post-processing-position identifying information indicates the other end of the both ends of the post-processing-edge.

According to the second aspect, in a case rotating the sheet post-processing edge towards one end thereof by 90° with respect to the center of a sheet, the controlling means updates the post-processing-edge identifying information depending on the 90° rotation together with updating the sheet post-processing-position identifying information so that the sheet post-processing-position identifying information indicates one of both ends of the post-processing-edge, whereby when sheets of size capable of a longitudinal transfer and a transverse transfer are used, the direction of transfer can be automatically changed depending on the conditions without making the sheet post-processing set by the user complicated, resulting in improving printing efficiency.

In an image forming apparatus according to a third aspect of the present invention based on the first aspect, wherein the sheet post-processing information further comprises sheet size information; wherein the storage means has an inhibition information storing area for storing edge size information regarding a length of edge of the sheet and sheet post-processing inhibiting information correspondingly; the image forming apparatus further comprises: error information outputting means; and judging means for judging whether the sheet-post-processing information to be set with the setting means indicates a sheet post-processing inhibition with reference to the inhibition information storing area, and for making the error information outputting means output error information when judging that the sheet post-processing is inhibited.

According to the third aspect, with reference to the storage contents in the storage means for storing the sheet post-processing inhibiting information corresponding to the edge size information regarding the length of edge of the sheet, the judging means judges whether the sheet post-processing information to be set by the setting means indicates the sheet post-processing inhibition, and the output means outputs the error information when judging that the judging means indicates the sheet post-processing inhibition, whereby it is possible for the user to take measures for errors regarding the post-processing-edge during setting the sheet post-processing information, resulting in improving operability and work efficiency.

In an image forming apparatus according to a fourth aspect of the present invention based on the third aspect, wherein in the case of judging that the sheet post-processing is inhibited, when the sheet post-processing-position identifying information indicates one end of the both ends of the post-processing-edge, the judging means judges whether sheet post-processing information regarding a second post-processing-edge adjacent to the post-processing-edge indicates the sheet post-processing inhibition with reference to the inhibition information storing area and, in a case of judging that the sheet post-processing regarding the second post-processing-edge is not inhibited, cancels the judgment of the sheet post-processing inhibition by judging that the errors can be automatically removed.

According to the fourth aspect, it is judged whether there is an error (sheet post-processing inhibition), which can be automatically removed during setting the sheet post-processing information and the judgment of the sheet post-processing inhibition is cancelled if there is an error which can be automatically removed, resulting in enabling to improve operability as well as to improve work efficiency by reducing wasted time.

In an image forming apparatus according to a fifth aspect of the present invention based on the first aspect, wherein the setting means is for setting the sheet post-processing information further including sheet identifying information for identifying a size and a direction of the sheet in a single image-forming job with a plurality of sheet sizes; the storage means has an inhibition information storing area storing edge size information regarding an edge length of sheet and sheet post-processing inhibiting information correspondingly; and, the image forming apparatus further comprises: error information outputting means; and judging means for, with reference to the inhibition information storing area, judging whether the sheet post-processing information to be set with the setting means indicates the sheet post-processing inhibition, and for making the error information outputting means output an error information in a case of judging that the sheet post-processing is inhibited in regard to one of a plurality of the sheet sizes; even though the lengths of edges has no equal size between the plurality of sheet sizes, the control means makes the image forming means form the image on the sheet on the basis of the provided image information and the sheet post-processing information, and makes the image forming means not form an image on the sheet in a case where the error information indicates the sheet post-processing inhibition.

According to the fifth aspect, even though an equal edge length among a plurality of sheets of different sizes does not exist in a single image forming job, it is possible to execute the sheet post-processing after forming an image, whereby the capability of the sheet post-processing means can be sufficiently utilized, resulting in improving the user's convenience.

In addition, for a single image forming job, the sheet post-processing information is set for the plurality of sheet sizes, it is judged whether the sheet post-processing information to be set by the setting means indicates the sheet post-processing inhibition, with reference to the storage contents in the inhibiting information storing means, during setting the sheet post-processing information, and if the result indicates the sheet post-processing inhibition, the error information is output before the image formation processing, resulting in that the sheet post-processing can be properly executed together with improving user's operability.

In an image forming apparatus according to a sixth aspect of the present invention based on the first aspect, wherein the setting means is for selectively designating the post-processing-edge or a sheet binding margin position of the sheet, or for designating both the post-processing-edge and the sheet binding margin position; the image forming apparatus further comprises: sheet turning-over direction determining means for determining a sheet turning-over direction of a plurality of sheets, on which images corresponding to the image information stored in the storage means are to be formed, on the basis of designation with the setting means; and image information changing means for changing the image information stored in the storage means so that an image formed on the back side of the sheet is rotated by 180° when a sheet turning-over direction is perpendicular to a sheet feed direction.

According to the sixth aspect, the sheet turning-over direction is automatically determined on the basis of designating either one of the post-processing-edge or the sheet binding margin position, and the image information is changed so that the image formed on the back side of a sheet is rotated by 180° when the sheet turning-over direction is perpendicular to the sheet feed direction, whereby it is possible to determine the sheet turning-over direction as user intends, according to designation of a dyad of the post-processing-edge and the sheet binding margin.

In an image forming apparatus according to a seventh aspect of the present invention based on the first aspect, wherein the setting means is for further setting sheet feed information, wherein the control means makes the image forming means form the image on the sheet on the basis of the sheet feed information, too, wherein the sheet feed information includes special-sheet set information substantially indicating set state of special-sheets on a sheet feeding tray, the special-sheets having been pre-processed so that a direction of image to be formed is designated, the image forming apparatus further comprises: a sheet feeding tray where sheets are stacked; sheet transporting means for transporting a sheet from the sheet feeding tray to the image forming means, and for transporting and discharging the sheet on which an image is formed by the image forming means; and image information changing means for, when the sheet feeding tray where the special sheets are stacked is used, determining whether the direction of an image included in the image information is rotated by 180° on the basis of the special sheet set information, and for changing the image information on the basis of the determination.

According to the seventh aspect, special sheet set information, which substantially indicates a set condition for a sheet feeding tray of a special sheet on which pre-processing has been executed so that the direction of an image to be formed is determined, is set by the setting means, the controller determines whether the direction of the image to be determined by the image information is rotated by 180° on the basis of the special sheet set information when the sheet feeding tray where the special sheets are located is used, and the image information is changed on the basis of the determination, whereby it is possible to prevent an error in the set direction or the image 180° rotating setting of special sheets for the sheet feeding tray, resulting in preventing-increased costs for forming the image, caused by a number of error images formed on the relatively expensive special sheets pre-printed and at the same time, reducing the waste of resources.

BRIEF DESCRIPTION OF THE DRAWINGS

FIG. 3 is an illustration of sheet post-processing information;

FIG. 4 is illustration of sheet post-processing setting error information;

DESCRIPTION OF THE PREFERRED EMBODIMENTS

Figure 1:
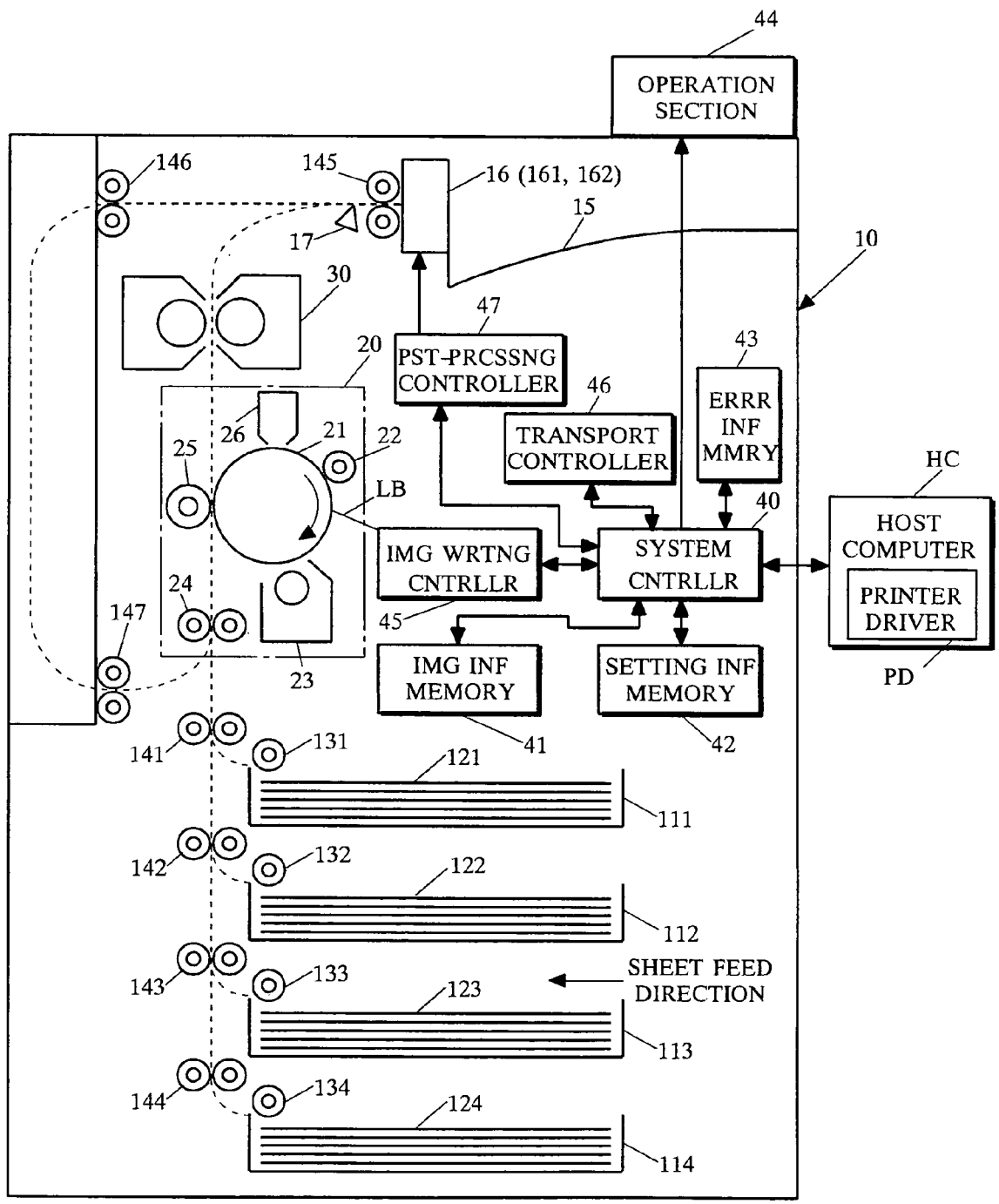
FIG. 1 is a schematic block diagram showing the configuration of an image forming system according to the present invention.

Referring now to the drawings, preferred embodiments of the present invention will be described in detail.

First Embodiment

FIG. 1 is a diagram showing a schematic configuration of an image forming system according to the present invention. This configuration is common in all the embodiments below.

The image forming system is configured by coupling an image forming apparatus 10, for example, a multifunction machine, to a host computer HC. For simplifying, the configuration of a case where the image forming apparatus 10 is used as a printer will be described below. In this case, the image forming apparatus 10 forms an image on a sheet based on image information provided by the host computer HC and information set by the image forming apparatus 10.

The image forming apparatus 10 comprises four sheet feeding trays 111 to 114 and sheets 121 to 124 are set in the respective sheet feeding trays. For example, sheets 121 and 122 are normal sheets, and sheets 123 and 124 are special sheets. Respective sheet feed rollers 131 to 134 are arranged corresponding to the sheet feeding trays 111 to 114. In addition, respective sheet transport rollers 141 to 144 are arranged corresponding to the sheet feed rollers 131 to 134. The sheets 121 to 124 can be fed to an image writing section 20 through the sheet feed rollers 131 to 134 and the sheet transport rollers 141 to 144, respectively.

In the image writing section 20 (which is a print engine in the present embodiment), surfaces of a photosensitive drum 21 are uniformly charged by a charge roller 22. The charge on the photosensitive drum 21 is selectively erased by a laser beam LB and an electrostatic latent image is thus formed on the photosensitive drum 21, and a charged toner is attached thereto by a developer 23 and the electrostatic latent image is thus developed.

Registration rollers 24 temporarily stop the transport of the sheets provided by the sheet transport roller 144, resume the transport at a predetermined timing and then provide the sheet between the electrostatic transfer roller 25 and the photosensitive drum 21. The electrostatic transfer roller 25 makes toner image of the photosensitive drum 21 electrostatically transfer on the sheet fed thereto. The sheet is then heated and pressed through a fixing device 30 and the toner image is thus fixed on the sheet. The toner remaining on the photosensitive drum 21 after the transfer is removed by a cleaner 26.

For example, in a case of a single-sided printing of a normal sheet, this sheet is discharged face down onto a sheet discharge tray 15 through a sheet discharge roller 145 and a sheet post-processing apparatus 16. The sheet post-processing apparatus 16 is for stapling or punching sheets on which images have been formed. This apparatus 16 is normally attached on a side of the body to post-process a stack of sheets in a batch (a sheet punching can be executed on every one sheet). This sheet post-processing apparatus is schematically shown in a reduced scale in FIG. 1.

A discharging sheet sensor 17 for detecting a discharging sheet is arranged near the sheet discharge roller 145.

In a case of a double-sided printing or in a case of a single-sided printing of special sheets in a mixed mode where a double-sided printing and a single-sided printing are mixed in a printing job (in this case, dummy blank-image information on a back side is inserted as described above so that the mode becomes identical to that of the double-sided printing), prior to the sheet discharge, the sheet is switched back with reversely rotating the sheet discharge roller 145, and returned to the registration roller 24 of the image writing section 20 through the sheet transport rollers 146 and 147.

In the switch back transport, the front end and the rear end of the sheet with respect to the sheet feed direction become opposite to each other together with the front and back sides of the sheet becoming opposite to each other. Subsequently, in the same manner as described above, an image is formed on the opposite side of the sheet by the image writing section 20, and the sheet is discharged onto the sheet discharge tray 15 through the fixing device 30, the discharge roller 145 and the sheet post-processing apparatus 16.

Accordingly, in the double-sided printed sheet discharged onto the sheet discharge tray 15, a second image has been formed on the lower side (front side) by the image writing section 20, and a first image has been formed on the upper side (back side) by the image writing section 20.

In order to control inner members of the image forming apparatus 10, the image forming apparatus 10 comprises a system controller 40. The system controller 40 is coupled to an image information memory (including work area) 41, a setting information memory 42, an error information memory

43, an operation section 44, an image writing section controller 45, a transport roller controller 46 and a sheet post-processing controller 47.

The system controller 40 temporarily stores the image information provided by the host computer HC in the image information memory 41. The image information, which is provided through a printing routine of an application program and a printer driver, is described in PDL (page description language) which does not depend on resolution of a device, etc. The system controller 40 stores the information, set by a user who operates the operation section 44, in the setting information memory 42. The setting information memory 42 is a non-volatile memory capable of being rewritten such as a flash memory. The error information memory 43 is a ROM for pre-storing an error table for judging error to be described later. The setting information memory 42 and the error information memory 43 may be constituted of an external storage device such as a hard disk.

The system controller 40 rewrites, if necessary, the contents of the image information memory 41 based on the contents of the setting information memory 42 and the error information memory 43 as described below, and provide them to the image writing section controller 45.

In a case where the information to be post-processed is included in the contents of the image information memory 41 or the setting information memory 42, the system controller 40 executes stapling or punching on a stack of sheets after forming images by means of a stapling apparatus 161 or a punching apparatus 162 of the sheet post-processing apparatus 16 through the sheet post-processing controller 47. Note that the sheet punching can be executed on every sheet.

Figure 2:
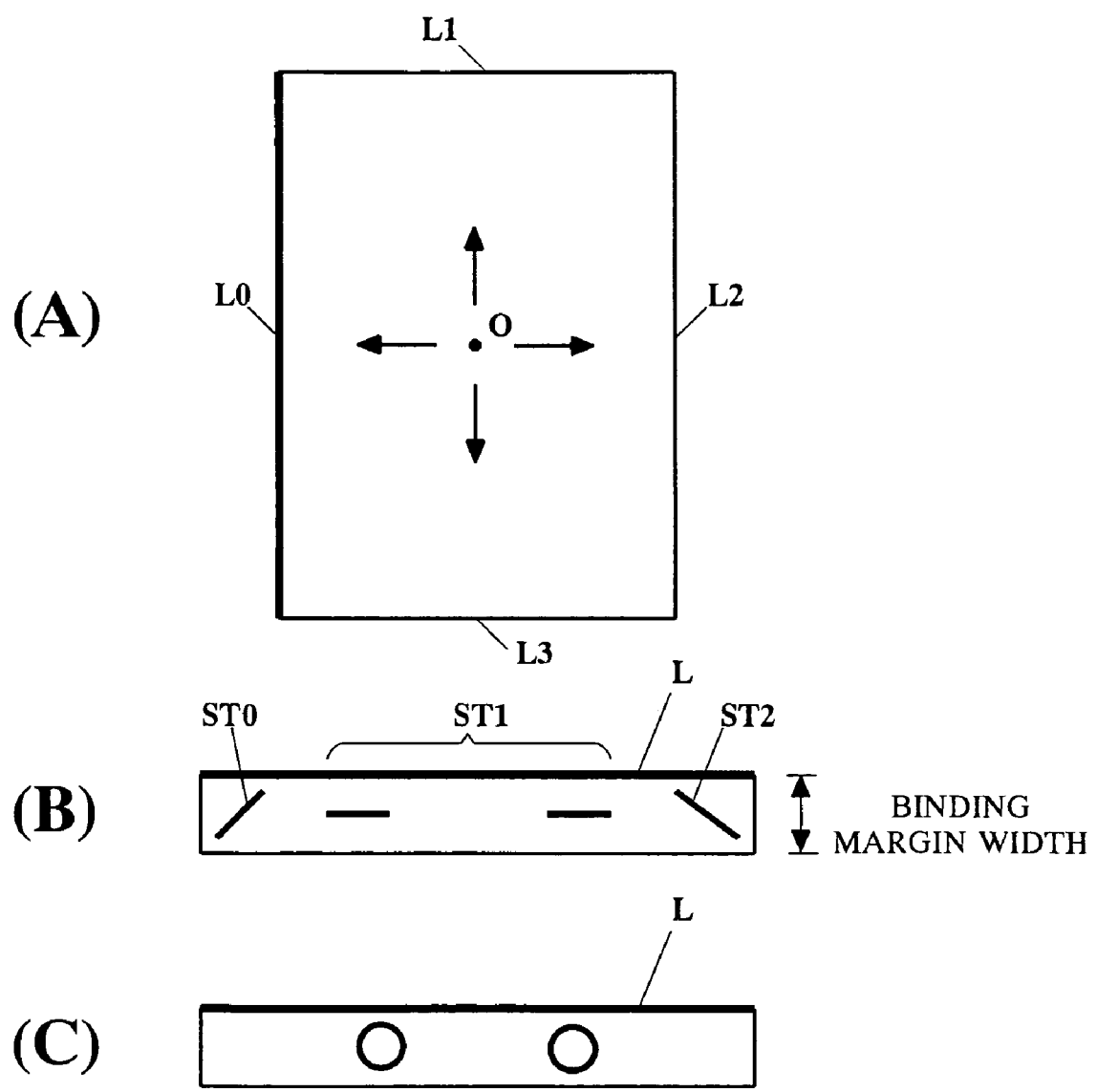
FIG. 2 is an illustration of sheet post-processing setting information.

FIG. 2 is an illustration of the setting information of a sheet post-processing. A case where the direction of sheet is longitudinal will be described below.

In FIG. 2(A), for the sheet of a longitudinal direction on which a portrait image is to be formed, one L of post-processing-edges L0 to L3 on which the sheet stapling or sheet punching is to be executed is designated. In the step that a user executes this designation, the post-processing-edge is the same as the sheet binding margin for determining a sheet turning-over direction. That is, a user may set the sheet binding margin as the post-processing-edge.

Regarding a sheet post-processing-position, it is designated as a position on the post-processing-edge L with respect to the center O of the sheet. Thereby, the sheet post-processing-position does not depend on any specific post-processing-edge. As shown in FIG. 2(B), a stapling position on the post-processing-edge L is one of ST0, ST1 or ST2. The ST0 and ST2 are end (corner) oblique stapling, and ST1 is a two-point stapling. Sheet punching information is one of a two-hole sheet punching, a four-hole sheet punching or no sheet punching on the post-processing-edge L. FIG. 2(C) shows a case of the two-hole sheet punching on a post-processing-edge L.

As described above, by using the dyad of the position information of the post-processing-edge and the post-processing-position information on the post-processing-edge with respect to the sheet center O, the sheet post-processing information can be simplified. Thereby to use the dyad of them enables the sheet post-processing routine to be also simplified.

FIG. 3 shows a data structure of the sheet post-processing information, set at the operation section 44 and stored in the setting information memory 42.

As described below, this information consists of a post-processing-edge code (post-processing-edge ID) EC=one of 0 to 4 showing that the post-processing-edge is one of L0 to L3 or non selection; a staple code (stapling position ID) SC=one of 0 to 3 showing that the stapling position is one of ST0 to ST2 on the selected post-processing-edge or non-selection of stapling; a punch code PC=one of 0 to 2 showing whether two-hole or four-hole sheet-punching is needed or not; a width (mm) of the sheet binding margin; and a sheet size (including a sheet direction).

The length of a post-processing-edge is determined by a sheet size and a post-processing-edge ID, and the actual position of each of the stapling positions ST0 to ST2 in the length direction on a processing edge is stored in a ROM (not shown) within the sheet post-processing controller 47. The sheet post-processing is executed in the center in the width direction of the sheet binding margin. The sheet size and the sheet direction (longitudinal or transverse) are set on a sheet setting screen which is not shown.

The 'sheet binding margin' is a user side concept which determines sheet binding position and sheet turning-over direction, while the 'post-processing-edge' is a sheet post-processing means side concept which indicates the processing by the sheet post-processing means. The post-processing-edge ID set by the user is copied and stored as the sheet binding margin ID, prior to an automatic change of the post-processing-edge ID to be described below.

Figure 8:
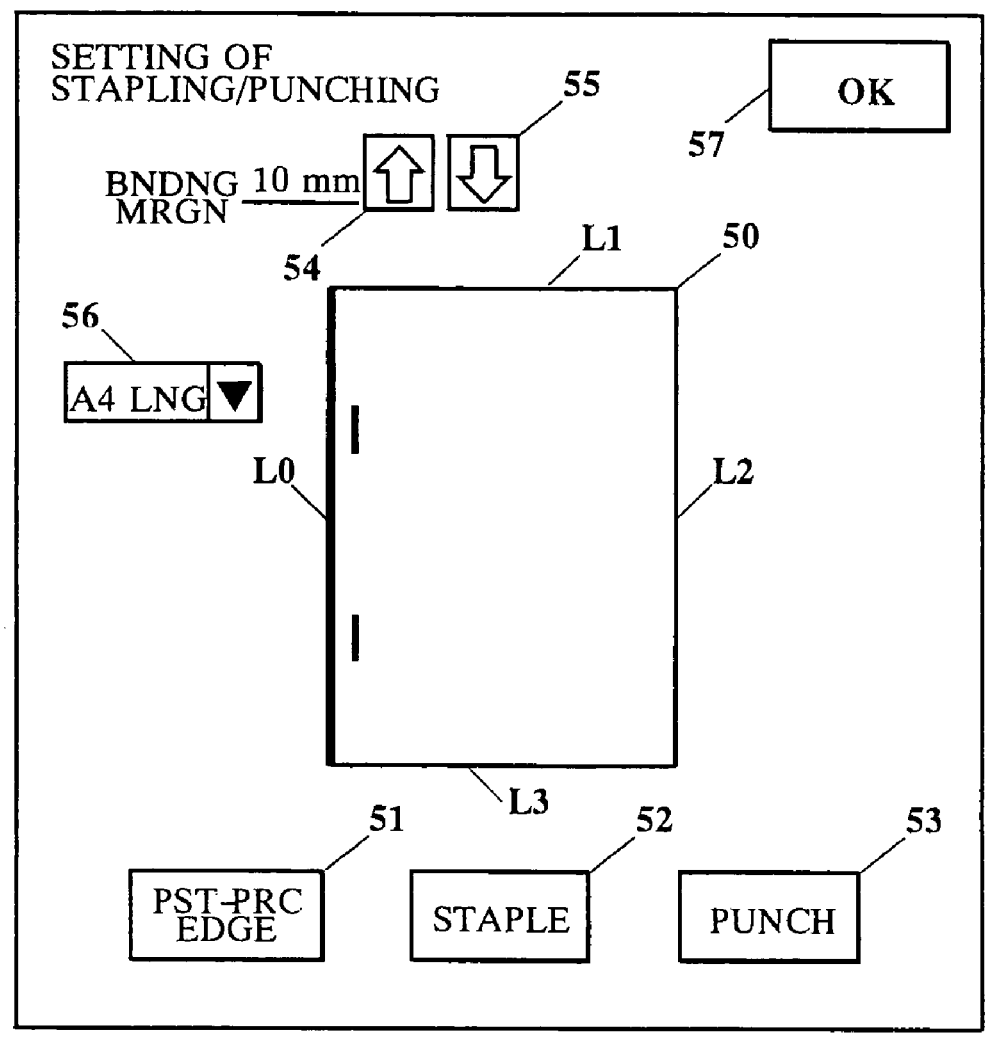
FIG. 8 is a diagram showing a sheet post-processing setting screen to be displayed on a touch panel of an operation section.

FIG. 8 shows a sheet post-processing setting screen which is displayed on the touch panel of the operation section 44 in FIG. 1. The screen displays a sheet 50, a post-processing-edge button 51, a staple button 52, a punch button 53, an increment button 54, a decrement button 55, a sheet selecting combo box 56 and an 'OK' button 57.

The direction of the sheet 50 on the setting screen is consistent with that set on the sheet setting screen. In FIG. 8, if the sheet 50 is fed on the upper end side thereof, a desired image can be formed without rotating an image in the image forming apparatus 10. That is, the sheet feed direction prior to setting the post-processing-edge is the upper end side of the sheet 50 (longitudinal transfer).

The image of the sheet 50 is changed in responses to a touch on one of the buttons 51 to 53 as described below, enabling the sheet post-processing basic information to be easily set. In addition, whenever the increment button 54 is touched, the setting value of the sheet binding margin width is increased by 1 mm. Whenever the decrement button 55 is touched, the setting value of the sheet binding margin width is decreased by 1 mm.

Figure 5:
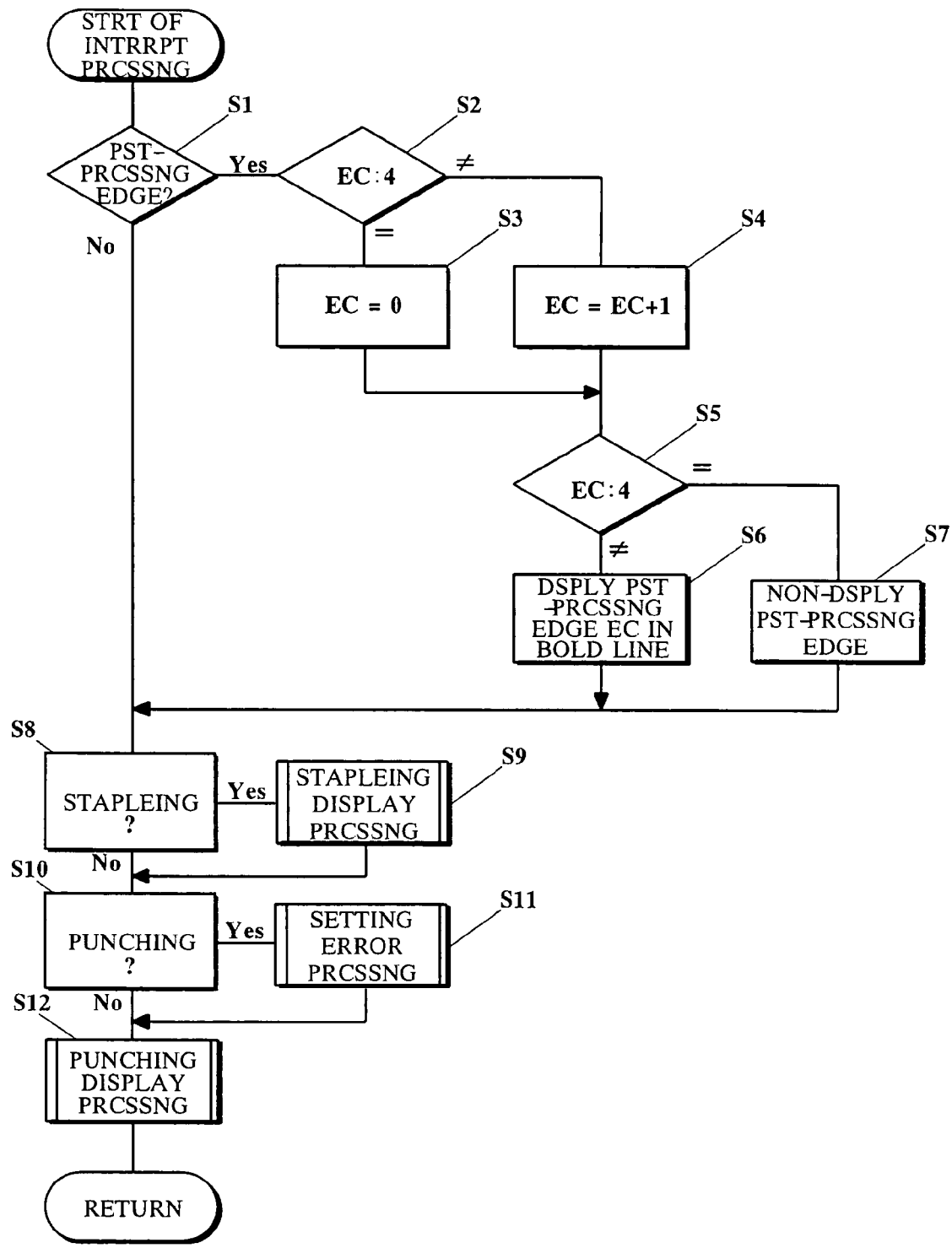
FIG. 5 is a flow chart showing an interrupt processing executed when touching one of a post-processing-edge button, a staple button, a punch button on a touch panel.

FIG. 5 is a flow chart showing an interrupt processing when one of the buttons 51 to 53 is touched. The respective post-processing-edge code EC, staple code SC and punch code PC are used corresponding to buttons 51 to 53 and the displays on the sheet 50 are changed according to their values.

Figure 10:
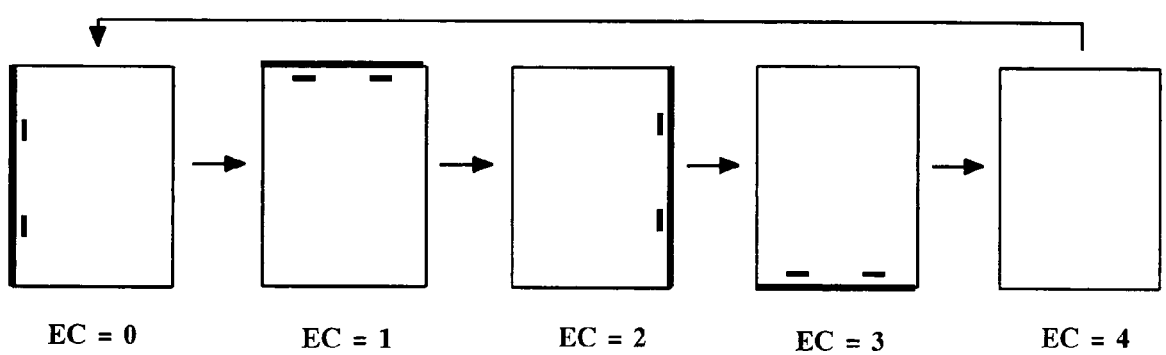
FIG. 10 is an illustration regarding steps S2 to S7 in FIG. 5.

Firstly, whenever the post-processing-edge button 51 is touched, the selected post-processing-edge (a bold line) on the sheet 50 in FIG. 8 is changed as shown in FIG. 10. FIG. 10 shows a case where the staple code SC and the punch code PC are set at 1 and 2, respectively. The initial value of the post-processing-edge code EC is '0', the maximum value of the post-processing-edge code EC is '4' and following '4' it is returned to '0'. In the case of EC=4, the bold line is not displayed, which means that there is no sheet post-processing.

That is, when the post-processing-edge button 51 is touched, in FIG. 5, the process is judged as affirmation in step S1 and thus goes to step S2. If EC=4, it becomes EC=O in step S3 and if not, the post-processing-edge code EC is increased by one in step 54. Subsequently, if it is judged as EC=4 in step 5, then the post-processing-edge (a bold line) is not displayed in step S7, and if not, the post-processing-edge corresponding to the post-processing-edge code EC is displayed as a bold line in step S6.

Figure 11:
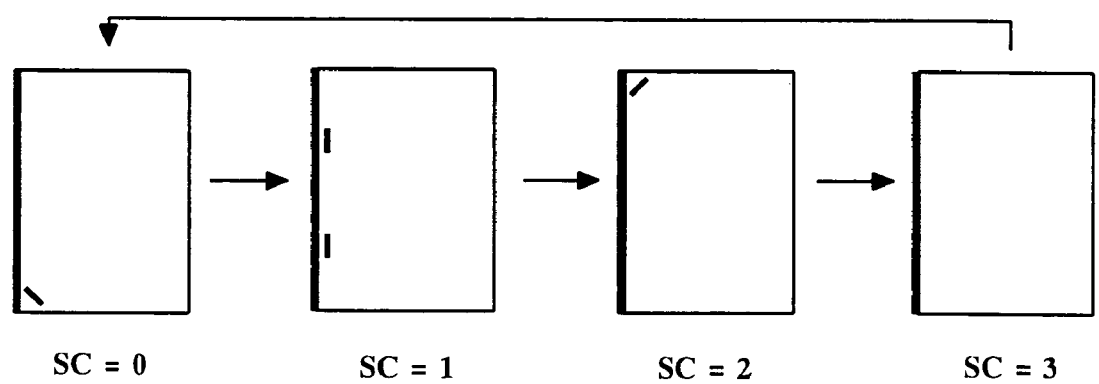
FIG. 11 is an illustration regarding step S9 in FIG. 5.

In the same manner, whenever the staple button 52 is touched, the sheet post-processing position on the selected post-processing-edge (a bold line) is changed as shown in FIG. 11. FIG. 11 shows a case where the post-processing-edge code EC and the punch code PC are set at 0 and 2, respectively. The initial value of the staple code SC is '1', the maximum value of the staple code SC is '3' and following '3' it is returned to '0'. In the case of SC=3, the stapling is not displayed, which means that there is no stapling-processing.

That is, when the staple button 52 is touched, in FIG. 5, the process is judged as negative in step S1, judged as affirmation in step S8 and then goes to step S9. Likewise as described above, the staple code SC is increased by one or returned to zero, thereby executing the display on the sheet 50 in FIG. 8 according to the value of the staple code SC.

Figure 12:
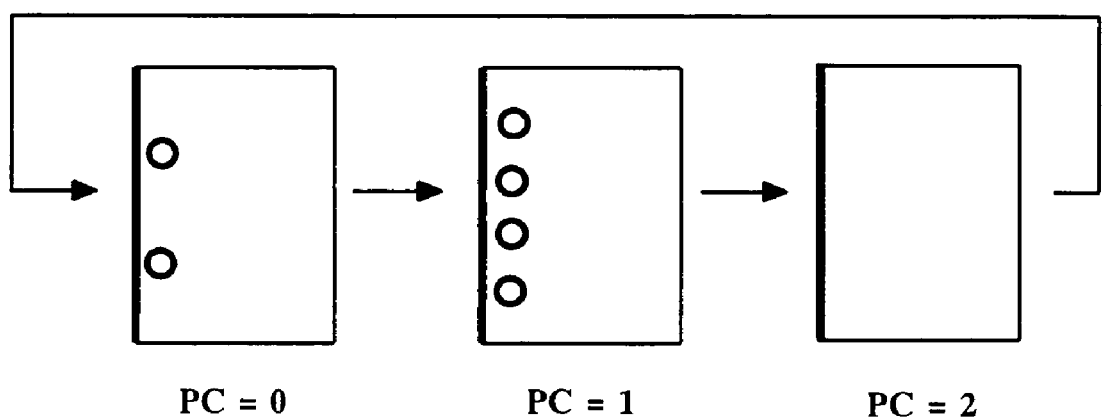
FIG. 12 is an illustration regarding step S11 in FIG. 5.

In the same manner, whenever the punch button 53 is touched, the display of a punch hole on a selected post-processing-edge is changed as shown in FIG. 12. FIG. 12 shows a case where the post-processing-edge code EC and the staple code SC are set at 0 and 3, respectively. The initial value of the punch code PC is '0', the maximum value of the punch code PC is '2' and following '2' it is returned to '0'. In the case of PC=0, the punch hole is not displayed, which means that there is no punching-processing. PC is '1' or '2' means that there is two-hole punching or four-hole punching, respectively.

That is, when the punch button 53 is touched, in FIG. 5, the process is judged as negative in steps S1 and S8, judged as affirmation in step S10 and then goes to step S11. The punch code PC is increased by one or returned to zero, thereby, executing the display on the sheet 50 in FIG. 8 according to the value of the punch code PC.

In step S12, the error processing is executed as described below for the sheet post-processing setting information in the present step during the setting.

FIG. 4 is an illustration of an error table stored in the error information memory 43 in FIG. 1.

The size information and the punch code PC of the post-processing-edge of the sheet and error (inhibiting) contents corresponding thereto are described in the table. In FIG. 4, L and S imply a long edge and a short edge of the sheet, respectively. FIG. 4 shows only one example of error and for example, in the case where the post-processing-edge is a long edge of the sheet of a letter size or a long edge of the sheet of a B5 size, the two-hole punching (PC=1) is inhibited. The reason why the two-hole punching is inhibited in the case where the post-processing-edge is a long edge of the sheet of a letter size is based on a custom rather than a size. In addition, in the case where the post-processing-edge is a short edge of the sheet of an A4 size or a long edge of the sheet of a B5 size, four-hole punching (PC=2) is inhibited. In addition, in the case where the post-processing-edge is a long edge of the sheet of a B4 size, the transverse transfer (the inhibition of the sheet post-processing; meaning that "any" in the table does not depend on the value of PC) is inhibited.

Figure 6:
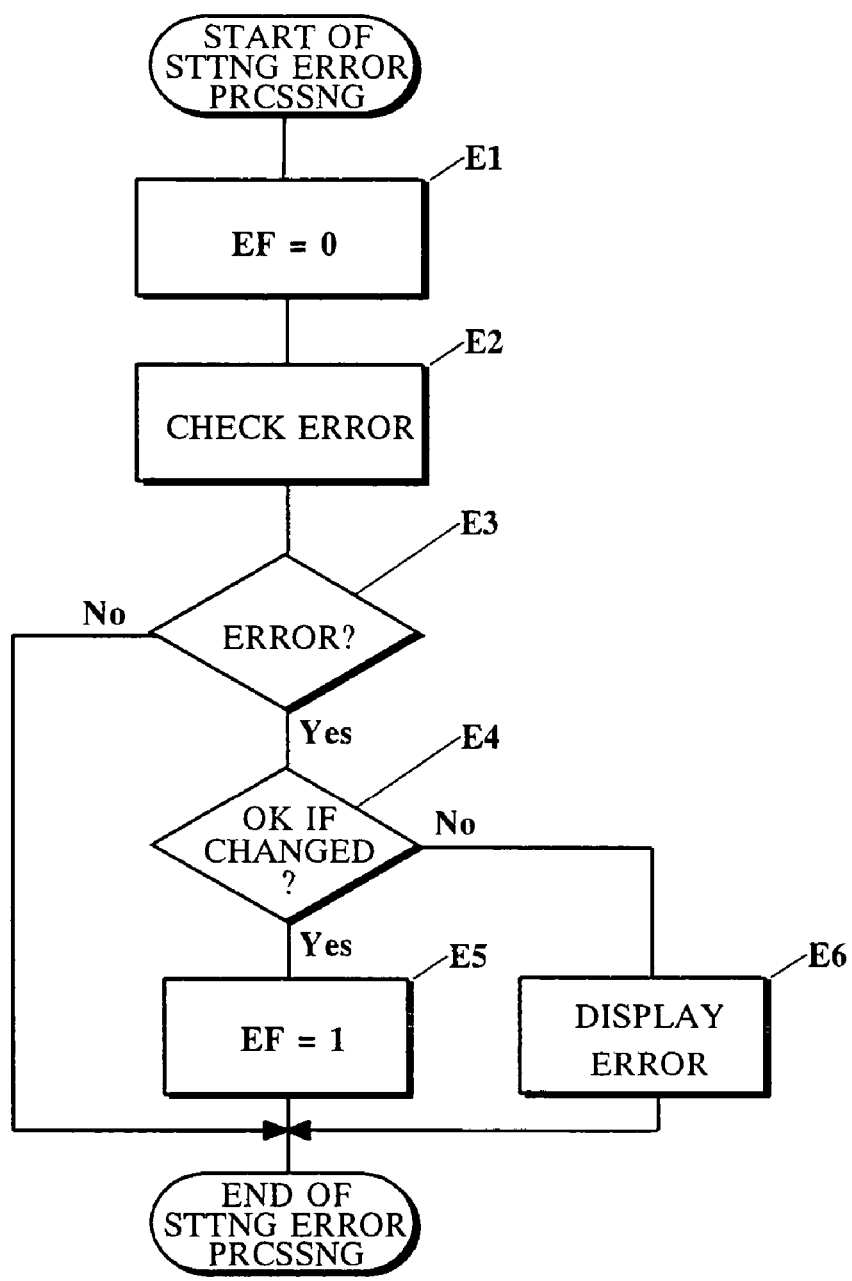
FIG. 6 is a detailed flow chart of step S12 in FIG. 5.

FIG. 6 is a flow chart showing the detailed contents of the setting error processing of step S12 in FIG. 5. The signs in parenthesis represent reference signs for identifying steps in the drawings.

(E1) Resetting an automatically removable error flag EF. The flag EF is for using in the processing of FIG. 7 to be described below.

(E2) With reference to a table of FIG. 4, checking whether the sheet post-processing indicated with the sheet post-processing information selected at the present time is inhibited (error) or not (E3) Proceeding to step E4 upon being judged as an error in step E2 and if not, ending the error processing.

Figure 13:
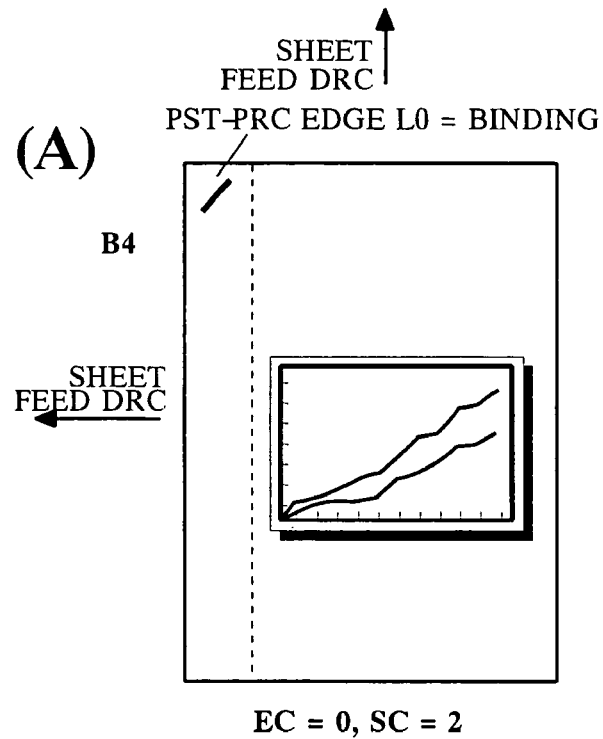
FIG. 13 is an illustration of error automatic removing in step S22B in FIG. 7.
Figure 13:
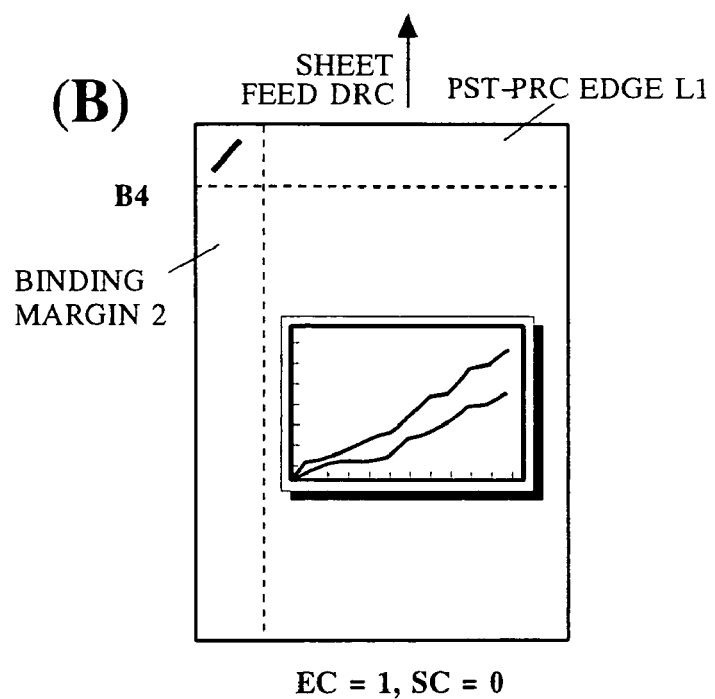

(E4) Judging whether or not the post-processing-edge can be changed into a neighboring edge without changing the sheet binding margin, and also, the error can be removed by the change. For example, as shown in FIG. 13(A), in the case where the L0 of a vertical sheet of B4 is the post-processing-edge and the one end thereof is set to be stapling processed, it is judged that the post-processing-edge can be changed into L1 without changing the sheet binding margin and the sheet staple-processing position, as shown in FIG. 13(B). In the judgment whether the error is removable or not, the same processing as step E2 is executed for the post-processing-edge after changing. In the case of FIG. 13(A), it is judged that the error can be removed by changing the post-processing-edge as shown in FIG. 13(B). As described below, the error is automatically removed and any display for the error is thus not required.

When judging that the error can be automatically removed, then the process goes to step E5, or else goes to step E6.

(E5) Setting an automatically removable error flag EF and ending the error processing.

(E6) Displaying the error information on the sheet post-processing setting screen simultaneously with generating an electronic buzz sound.

Figure 9:
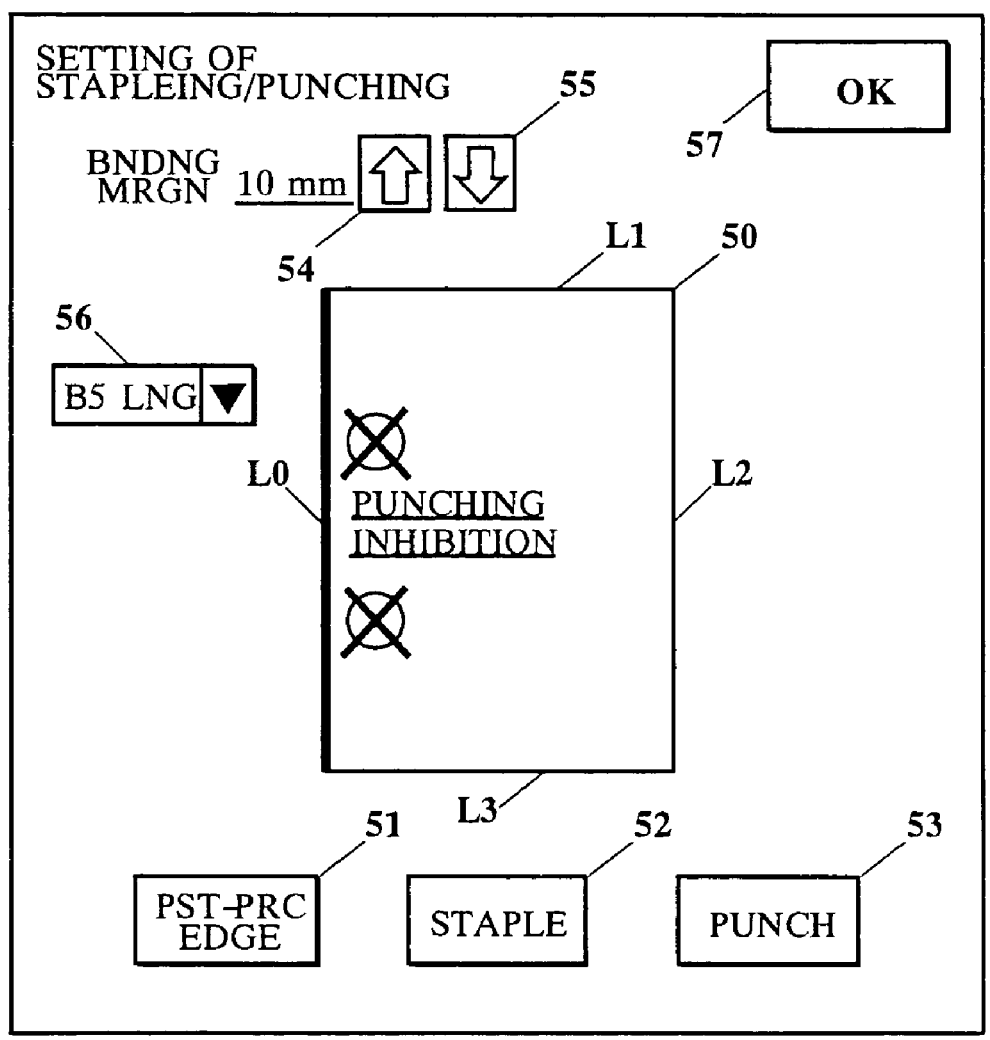
FIG. 9 is an illustration of error information to be displayed on the sheet post-processing setting screen.

For example, as shown in FIG. 9, in the case where the two-hole punching is set on the post-processing-edge L0 of a B5 sheet, x marks are overlapped and indicated on the two-hole punching indication and at the same time, the content of error corresponding to the table in FIG. 4 is displayed.

In FIG. 8, when an arrow portion of the sheet selecting combo box 56 is touched, a pull-down menu for selecting a sheet size is displayed; and when judging that the setting error cannot be automatically removed, it is used for the user to change the sheet size and to remove the error.

If the OK button 57 is touched, in the case where step E6 does not display the error, the setting value of the post-processing-edge code EC, the staple code SC, the punch code PC and the sheet binding margin width are stored and fixed in the setting information memory 42. In the case where the error is displayed, the sheet post-processing information is changed into an absence of the sheet post-processing.

Generally, the setting for the sheets can be executed in the host computer HC and it is the same in the present embodiments. That is, the setting screen such as FIG. 8 is displayed even when a printer driver installed in the host computer HC is driven. In this case, the setting may be made through click operation by pointing on a display screen using a pointing device, not the touch panel. In the case where the setting is made by both the host computer HC and the image forming apparatus 10, the host computer HC essentially has a priority for the setting. As an exception, if the image forming apparatus 10 is set to be a priority for the setting, the setting is made by the image forming apparatus 10.

Figure 7:
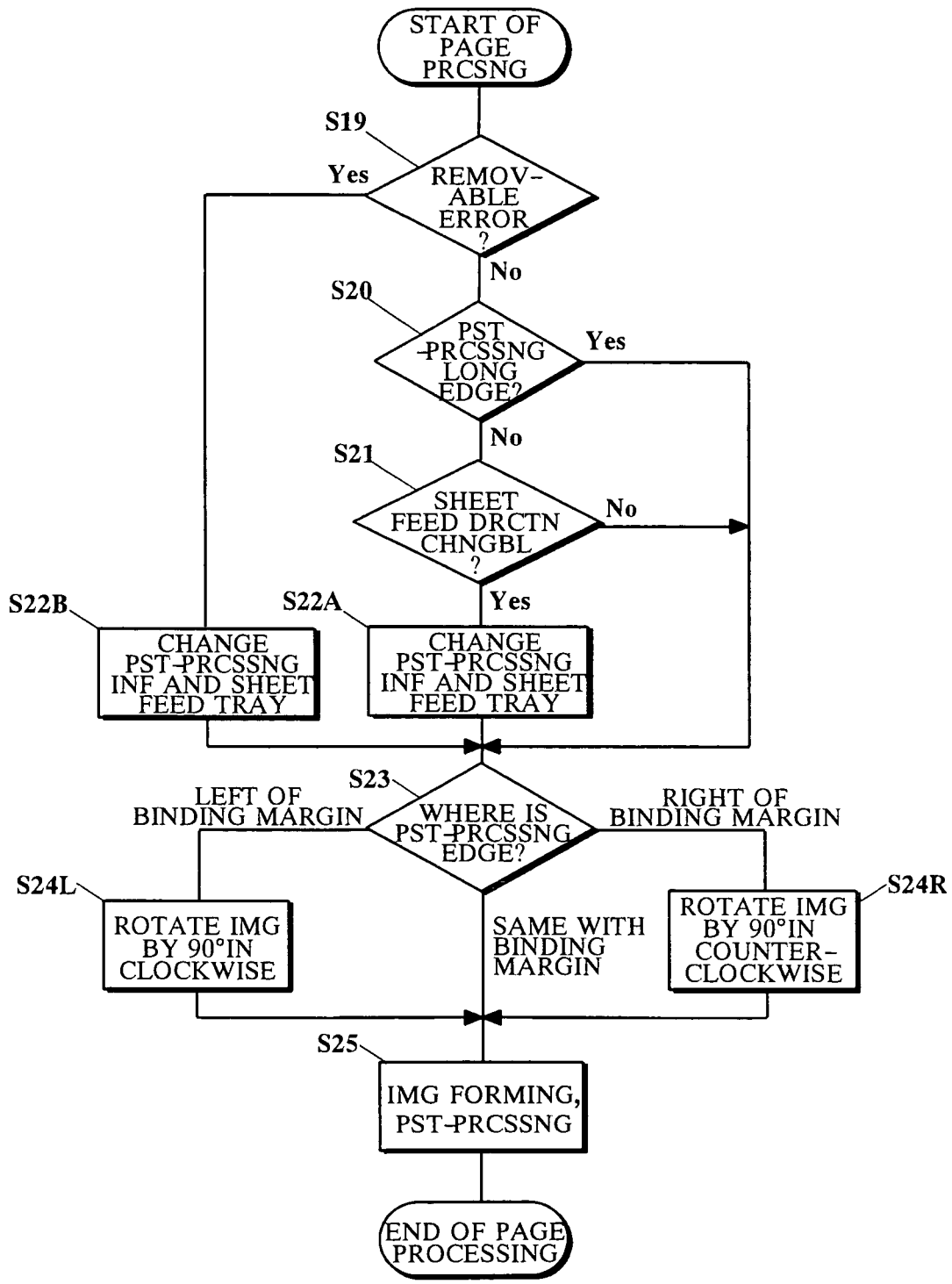
FIG. 7 is a schematic flow chart showing a processing of one page after an image forming apparatus receives image information for a single-sided printing from a host computer and stores it in an image information memory in a single printing job where a sheet post-processing is set.

FIG. 7 is a schematic flow chart showing a processing of one page after the image forming apparatus 10 receives the image information for printing the single-sided printed sheet from the host computer HC and stores it in the image information memory 41 in a single printing job where the sheet post-processing is set.

(S19) In the case where the automatically removable error flag EF is set in step E5 in FIG. 6, that is, in the step S12 in FIG. 5 immediately before touching the OK button 57, the process goes to step S22B and if not, goes to step S20.

(S20) In the contents of the image information memory 41, if the post-processing-edge is the long edge of the sheet, that is, the post-processing-edge code EC is '0' or '2', the process goes to step S23; and if the post-processing-edge is the short edge of the sheet, that is, the post-processing-edge code EC is '1' or '3', the process goes to step S21.

(S21) Regarding the page of the image information, in the case where the sheet size capable of both the longitudinal transfer and the transverse transfer is designated in the image forming apparatus 10; when the sheet post-processing information represents that there is no punch PC=2; the staple code is '0' or '2'; and also the sheets for the transverse transfer are set in the sheet feeding tray, the sheet feed direction is judged to be changeable and then the process goes to step S22A, or else goes to step S23.

(S22A) In order that the longitudinal transfer of the sheet is to be the transverse transfer, the contents of FIG. 3 is rewritten and at the same time, the sheet feeding tray is changed to have the identical sheet size and the transverse transfer.

Figure 14:
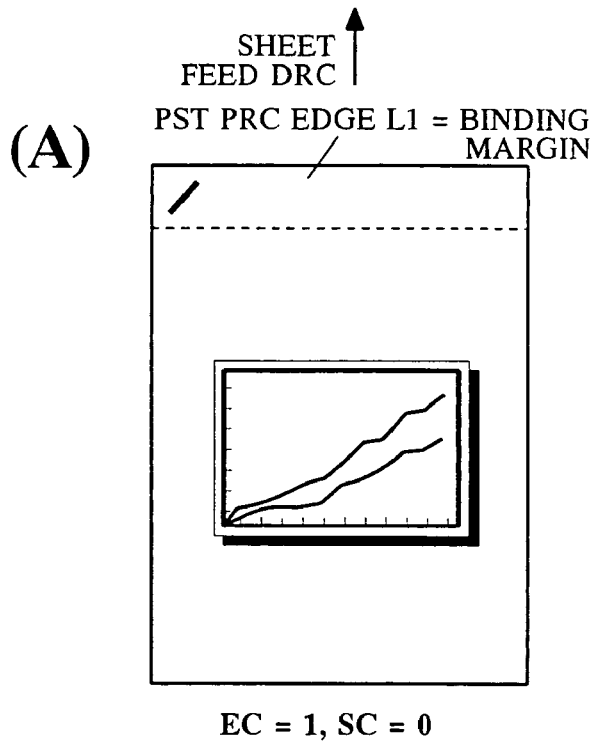
FIG. 14 is an illustration regarding step S22A in FIG. 7 in a case where a post-processing-edge is changed towards a left edge of a sheet binding margin.
Figure 14:
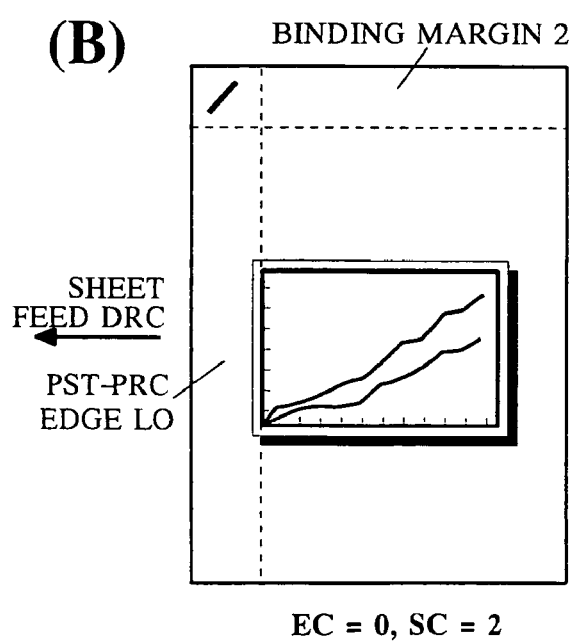

The rewriting will be described as follows. That is, as shown in FIG. 14(A) in the case of EC=1 and SC=0, they are changed into EC=0 and SC=2 as shown in FIG. 14(B). If SC=−1 is changed into SC=2 with circular principle, it is the same as that both the post-processing-edge code EC and the staple code SC are decreased by 1.

Figure 15:
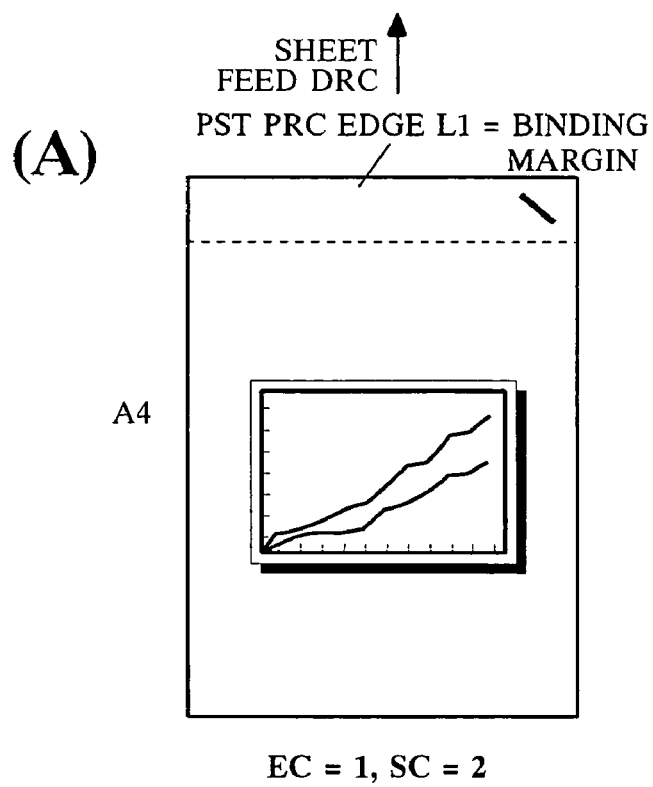
FIG. 15 is an illustration regarding step S22B in FIG. 7 in a case where a post-processing-edge is changed towards a right edge of a sheet binding margin.
Figure 15:
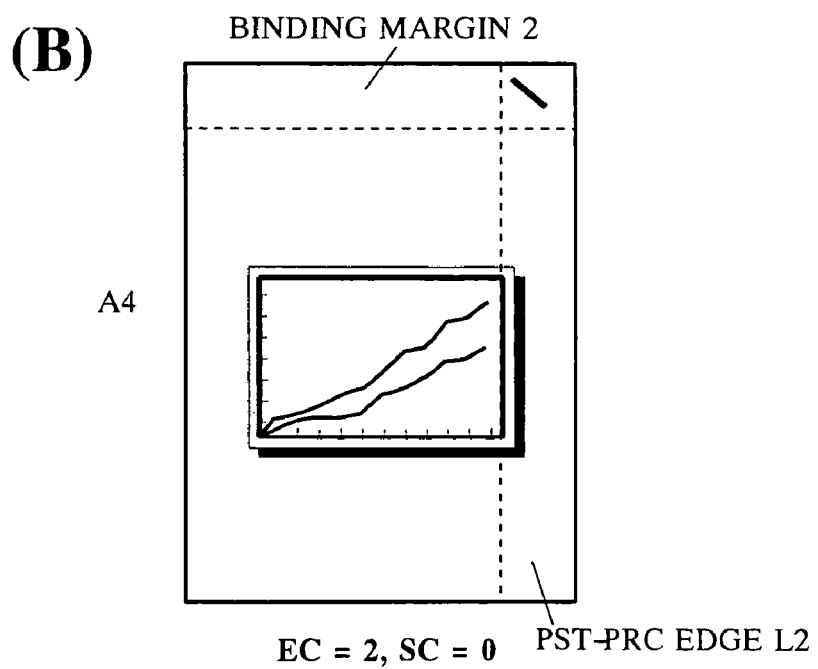

In addition, as shown in FIG. 15(A) in the case of EC=1 and SC=2, they are changed into EC=2 and SC=0 as shown in FIG. 15(B). If SC=3 is changed into SC=0 with the circular principle of the staple code SC excepting SC=3 representing that there is no indication, it is the same as that both the post-processing-edge code EC and the staple code SC are increased by 1.

The case of EC=3 is the same as the above. That is, in the case of EC=3 and SC=0, they are changed into EC=2 and SC=2; and in the case of EC=3 and SC=2, they are changed into EC=0 and SC=0.

Based on such a rule, the processing can be simplified. Subsequently, the process goes to step S23.

(S22B) In order to automatically remove the error, the contents of FIG. 3 are rewritten and at the same time, the sheet feeding tray is changed to have the same size sheet and it is also changed to the longitudinal transfer in the case of the transverse transfer and the transverse transfer in the case of the longitudinal transfer.

The rewriting is identical with the case of the step S22A. For example, as shown in FIG. 13(A), in the case of EC=0 and SC=2, it is also changed into EC=1 and SC=0 as shown in FIG. 13(B)

(S23) If the post-processing-edge is identical with the sheet binding margin, that is, in the case not through the step S22, then the process goes to step S25; if the post-processing-edge is on the right of the sheet binding margin, then the process goes to step S24R; and if the post-processing-edge is on the left of the sheet binding margin, then the process goes to step S24L.

(S24R) For the image information within the image information memory 41, the rotation angle information is changed so that the image is rotated towards the left (counterclockwise) by 90° and the process goes to step S25.

(S24L) For the image information within the image information memory 41, the rotation angle information is changed so that the image is rotated towards the right (clockwise) by 90° and the process goes to step S25.

When the stack of sheets post-processed is turned-over based on the sheet binding margin by such an image rotation, the image can be formed on the image writing device 20 so that the directions of the images should be the same for all pages.

In addition, as explained in FIG. 8, since the staple code SC represents the staple position with respect to the point 'O' so that the value of the staple code SC does not depend on the image rotation but depends on only the shift of the post-processing-edge for the sheet binding margin at the step S22.

(S25) The system controller 40 provides the contents of the image information memory 41 to the image writing section controller 45 and the image writing section controller 45 makes the image writing device 20 to form the images on the sheet in response thereto. The system controller 40 transports the sheet to a sheet transport device 16M through a sheet transport controller 46 in response to the request from the image writing section controller 45. In addition, the system controller 40 provides the sheet post-processing information to the sheet post-processing controller 47, and makes the sheet post-processing controller 47 to execute the sheet post-processing in response to the request provided by the sheet transport controller 46 when the condition capable of executing the sheet post-processing is made. The staple apparatus 161 or the punch apparatus 162 executes the sheet post-processing based on the sheet post-processing information.

As mentioned above, according to the first embodiment, in the case where the sheets of sizes suitable for transfer in the longitudinal and the transverse directions are used, the concept of the post-processing-edge which is different from the sheet binding margin determining the sheet turning-over direction is introduced. Based on this concept, the transfer direction of the sheet is automatically changed by differing the post-processing-edge from the sheet binding margin depending on the sheet post-processing conditions, resulting in that the setting of the sheet post-processing by the user is not complicated and printing efficiency can be improved by automatically changing the transfer direction depending on the conditions.

In addition, since the staple code and the punch code are used based on the sheet post-processing-position identifying information for identifying the sheet post-processing-position for the post-processing-edge, it can prevent the user from mistaking the execution of the sheet post-processing by coupling the data of staple code and punch code when these processes are executed, even though the sheet feed direction is changed.

In addition, since the sheet post-processing-position identifying information for identifying the sheet post-processing-position for the post-processing-edge, which does not depend on the post-processing-edge identifying information, is used, the sheet post-processing routine can be more simplified by greatly reducing the number of the sheet post-processing patterns than that of the prior art and at the same time, the error processing can also be simplified.

In addition, with reference to an error table described in which the edge size information of the edge length of the sheet corresponds to the sheet post-processing inhibiting information, as shown in FIG. 4, the error information is to be displayed on the operation section 44 by judging whether the sheet post-processing information represents the sheet post-processing inhibition during the setting of the sheet post-processing information, as shown in FIG. 6, resulting in that the user can take measures against the errors of the post-processing-edge during the setting of the sheet post-processing information.

In addition, it is judged whether there are automatically removable errors during the setting of the sheet post-processing information. If there are automatically removable errors, the errors are not displayed. Since the error removing processing is automatically executed in steps S22B, S23, S24 in FIG. 7 after the setting of the sheet post-processing information, it is possible to improve operability and to enhance work efficiency by reducing wasted time for users.

In the error removing processing, the image is automatically rotated to be the desired sheet turning-over direction in steps S23, S24 in FIG. 7, enabling to reduce the user's burden.

In addition, in the first embodiment of the present invention, only the case where the direction of the sheet is set longitudinally (portrait) has been described. However, as to the case where the direction of the sheet is set transversely (landscape), it is clear that it can be processed in the same manner as described above, putting the sheet 50 of FIG. 8 in a transverse direction.

In addition, in the first embodiment of the present invention, the case where the post-processing-edge is automatically changed from the short edge to the long edge has been described. However, the present invention may automatically change either of the short edge and the long edge of the post-processing-edge to the other. In the case where the post-processing-edge set is the long edge and the transverse-transfer sheets are not set in the sheet feeding tray of the image forming apparatus, the present invention may have the configuration capable of forming the image by automatically changing the post-processing-edge from the long edge to the short edge.

Furthermore, in the first embodiment of the present invention, the case where each edge is viewed with respect to the sheet center O in FIG. 2 has been described. However, in the case of viewing opposing to each edge of the sheets at the upper part and the lower part with respect to the sheet center O or an outer side of the sheet, the results are same. Therefore, the present invention is satisfied as substantially viewing each edge with respect to the sheet center O.

Moreover, in the first embodiment of the present invention, only the case of the single-sided printing has been explained. However, it is clear that the present invention is applicable to the case of the double-sided printing. In the case of forming an opposite side image in the double-sided printing, the direction of the image is to be the same direction for all pages if the stack of sheets post-processed in the sheet post-processing apparatus is turned-over on the basis of the sheet binding margin by rotating the image by 180° when the direction of the image is perpendicular to the sheet feed direction.

In addition, the sheet post-processing means is satisfied if there is at least one of apparatus making the post-processing-edge changeable, for example, the stapling apparatus in the image forming apparatus 10.

Second Embodiment

Figure 16:
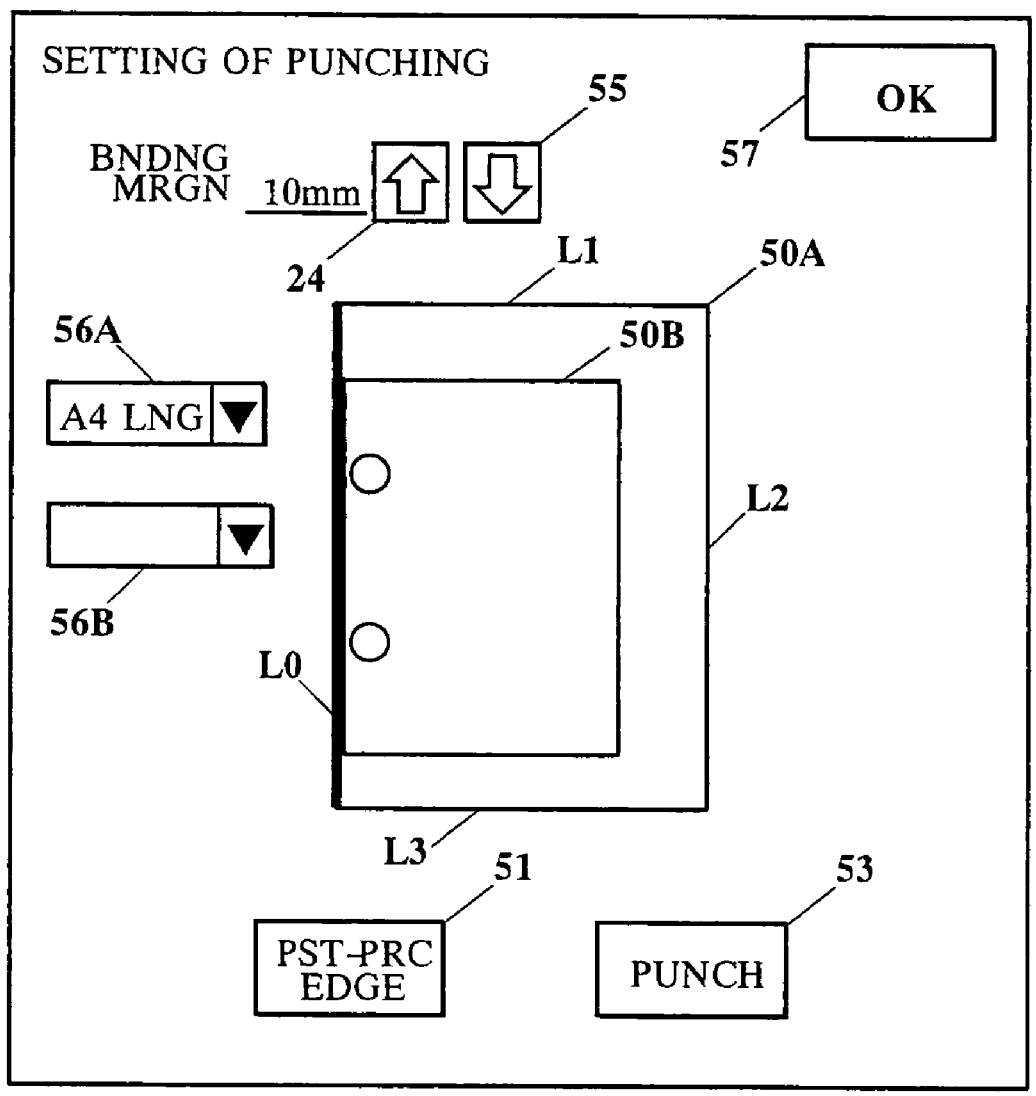
FIG. 16 is a diagram showing a sheet post-processing setting screen to be displayed on the touch panel of the operation section in FIG. 1.
Figure 17:
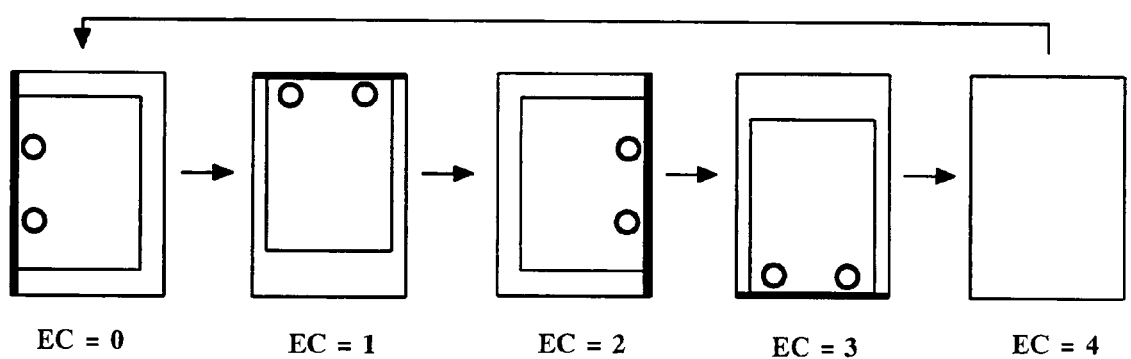
FIG. 17 is an illustration of a post-processing-edge to be changed and selected whenever the post-processing-edge button of FIG. 16 is touched.
Figure 18:
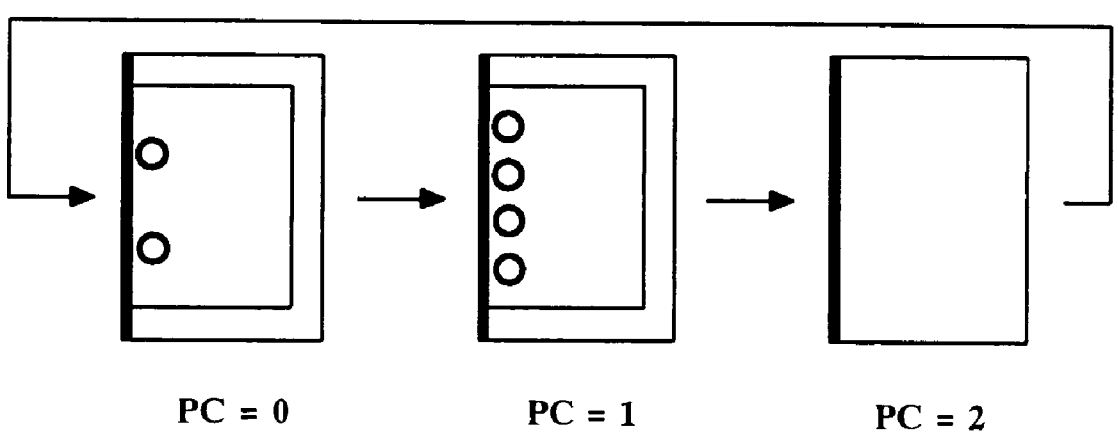
FIG. 18 is an illustration of sheet post-processing contents to be changed and selected whenever the punch button of FIG. 16 is touched.

An image forming apparatus according to a second embodiment of the present invention will now be described. FIG. 16 shows a sheet post-processing setting screen to be displayed on the touch panel of the operation section 44 in FIG. 1. Sheet selecting combo boxes 56A, 56B, sheets 50A, 50B, a post-processing-edge button 51, a punch button 53, an increment button 54, a decrement button 55, and an OK button 57 are displayed on the screen.

When an arrow portion of the sheet selecting combo box 56A is touched, pull-down menu for selecting a sheet size and direction is displayed; and when one of the sheet size and direction is touched, the sheet 50A corresponding thereto is displayed on the setting screen of FIG. 16. In the case of the sheet selecting combo box 56B is also the same above, and the sheet 50B corresponding to the selected sheet size and direction is displayed on the setting screen of FIG. 16.

The sheets 50A and 50B selected in the sheet selecting combo boxes 56A, 56B are displayed with making the both post-processing-edges and the centers thereof consistent. In FIG. 16, if the sheets 50A and 50B are fed to the upper end side thereof, the desired image can be formed without rotating the image in the image forming apparatus 10. That is, the sheet feed direction as shown in FIG. 16 is the upper end side of the sheets 50A and 50B (transverse transfer).

The images of the sheets 50A and 50B are changed as described below depending on touches of the buttons 51 and 53, enabling the sheet post-processing basic information to be easily set. In addition, whenever the increment button 54 is touched, the setting value of the sheet binding margin width is increased by 1 mm. Whenever the decrement button 55 is touched, the setting value of the sheet binding margin width is decreased by 1 mm.

The interrupt processing when the post-processing-edge button 51 or the punch button 53 is touched is the same as the flow chart as shown in FIG. 5 except the step S12 in the flow chart.

In step S12, with reference to the table of FIG. 4, it is checked whether the sheet post-processing indicated by the sheet post-processing information selected at the present time is inhibited (error) or not.

Figure 19:
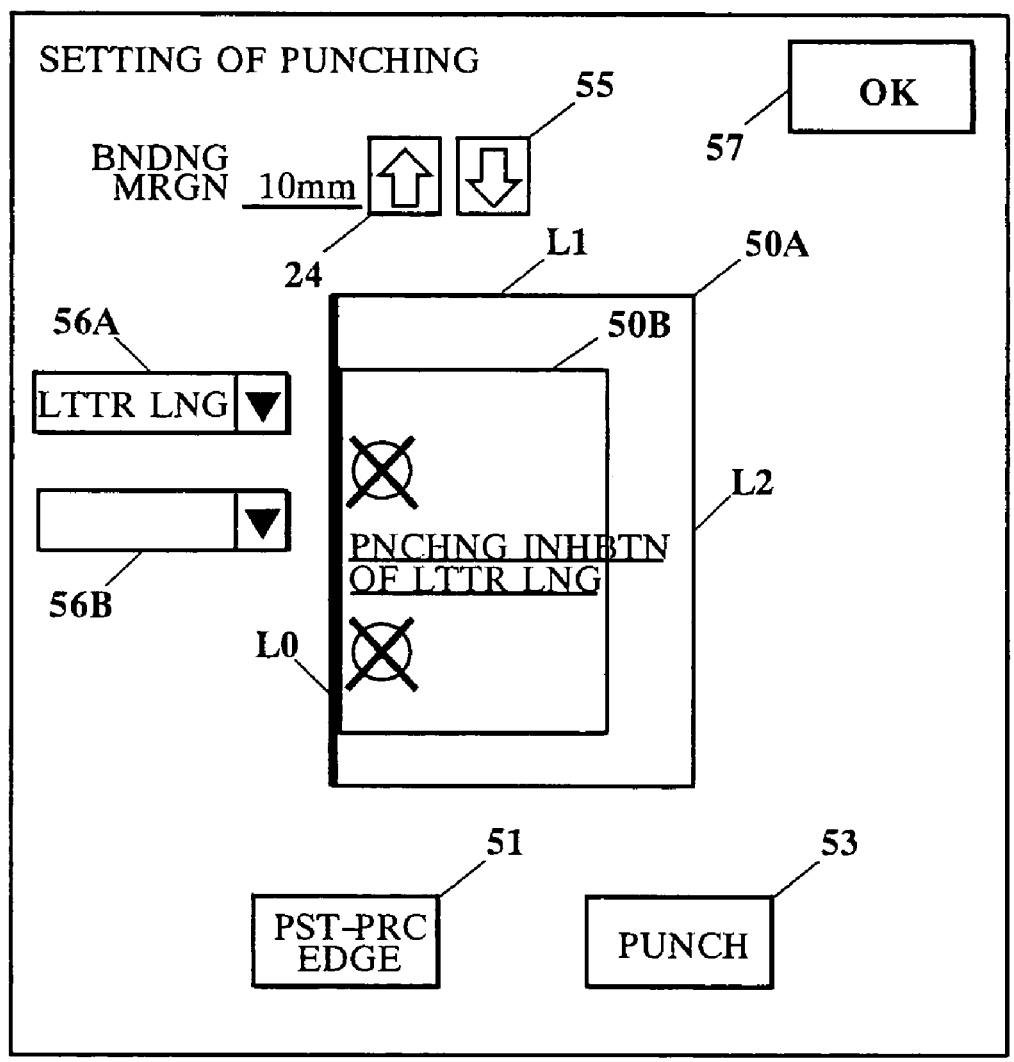
FIG. 19 is an illustration of error information to be displayed on a sheet post-processing setting screen.

When the post-processing is judged as the error, the contents of the error are displayed on the touch panel with the sheet size and direction being the subject of the error, and also the electronic buzz sound is generated. For example, as shown in FIG. 19, in the case where the two-hole punching is set on the post-processing-edge L0 of the longitudinal sheet of the letter size, x mark is overlapped and displayed on the two-hole punching indication and at the same time, the contents of error corresponding to the table in FIG. 4 are displayed with the sheet size.

If the OK button 57 as shown in FIG. 16 is touched, the information in FIG. 3 is stored and fixed in the setting information memory 42 in FIG. 1 if there is no error displaying condition. If there is the error displaying condition, the sheet post-processing information is changed into an absence of the sheet post-processing.

Others are the same as the first embodiment of the present invention as above.

As mentioned above, according to the second embodiment of the present invention, with reference to a single job of image forming, the sheet post-processing information is set for a plurality of sheet sizes as shown in FIG. 3; and it is judged whether the sheet post-processing inhibition is indicated or not with reference to the error table as shown in FIG. 4 during the setting of the sheet post-processing information. If the result does not indicate the sheet post-processing inhibition, even in the case where there are no edges whose lengths are consistent among the sheets with a plurality of sheet sizes, the image is formed on the sheet by the image forming means on the basis of the image information provided and the sheet post-processing information set, and the sheet post-processing is executed by the sheet post-processing means, thereby sufficiently utilizing the capability of the sheet post-processing means and improving the user's convenience.

In addition, in the operation section 44, since the edges of the sheet with a plurality of sheet sizes corresponding to each other are selected all together as the post-processing-edge and the sheet post-processings of same kinds corresponding to each of the post-processing-edges are selected at a time, there is no need to separately set the sheet post-processing information on each of the different sized sheets. Furthermore, in the case where the sheet post-processing is inhibited for the sheet of any size, the contents are displayed, resulting in that a portion of the set sheet post-processing setting information is not wasted. Therefore, the sheet post-processing information can be easily and rapidly set, improving the user's operation.

In addition, the sheet images with a plurality of sheet sizes are overlapped and displayed on the operation section 44 so that the selected post-processing-edges are approximately positioned on the same line and the center points of the selected post-processing-edge are approximately consistent. Furthermore, the selected post-processing-edge or the sheet post-processing contents thereof can be changed by corresponding to the touch input. Therefore, the setting error is prevented and at the same time, the sheet post-processing information can be more easily and rapidly set, improving the user's operation.

Furthermore, in the second embodiment of the present invention, the case where two kinds of the sheet sizes are used in a single job has been described. However, the present invention is applicable to three or more kinds of the sheet sizes.

Moreover, in the second embodiment of the present invention, the case where the sheet post-processing is the sheet punch-processing has been described. However, the present invention is able to execute the sheet post-processing, even in the case where there are no edges whose lengths among the sheets with a plurality of sheet sizes are consistent.

In addition, instead of displaying the sheet selecting combo boxes 56A and 56B in FIG. 16, it may have the configuration to display the list regarding the sizes and directions of the sheets and also display, for example, checking boxes to each of them in order to make checking mark (✓), etc., on selected checking boxes.

In the second embodiment of the present invention, the case where the sheet direction is set longitudinally (portrait) has been described. However, even in the case where the sheet direction is set transversely (landscape), it is clear that it can be processed in the same manner as described above, putting the sheet indicated in FIG. 16 in a transverse direction.

In the second embodiment of the present invention, the case of the single-sided printing has been described. However, it is clear that the present invention is applicable to the double-sided printing.

Third Embodiment

An image forming apparatus according to a third embodiment of the present invention will now be described below.

When a sheet post-processing is a two-point stapling or a two-hole punching, the sheet turning-over direction of a stack of sheets is determined. However, when there is one-point stapling or no the sheet post-processing, the sheet turning-over direction is not determined. Therefore, both a post-processing-edge and a sheet binding margin position can be designated, and the user can clearly and uniquely define the sheet turning-over direction as one's own intention on the basis of a user's designation information, as described below.

Figure 20:
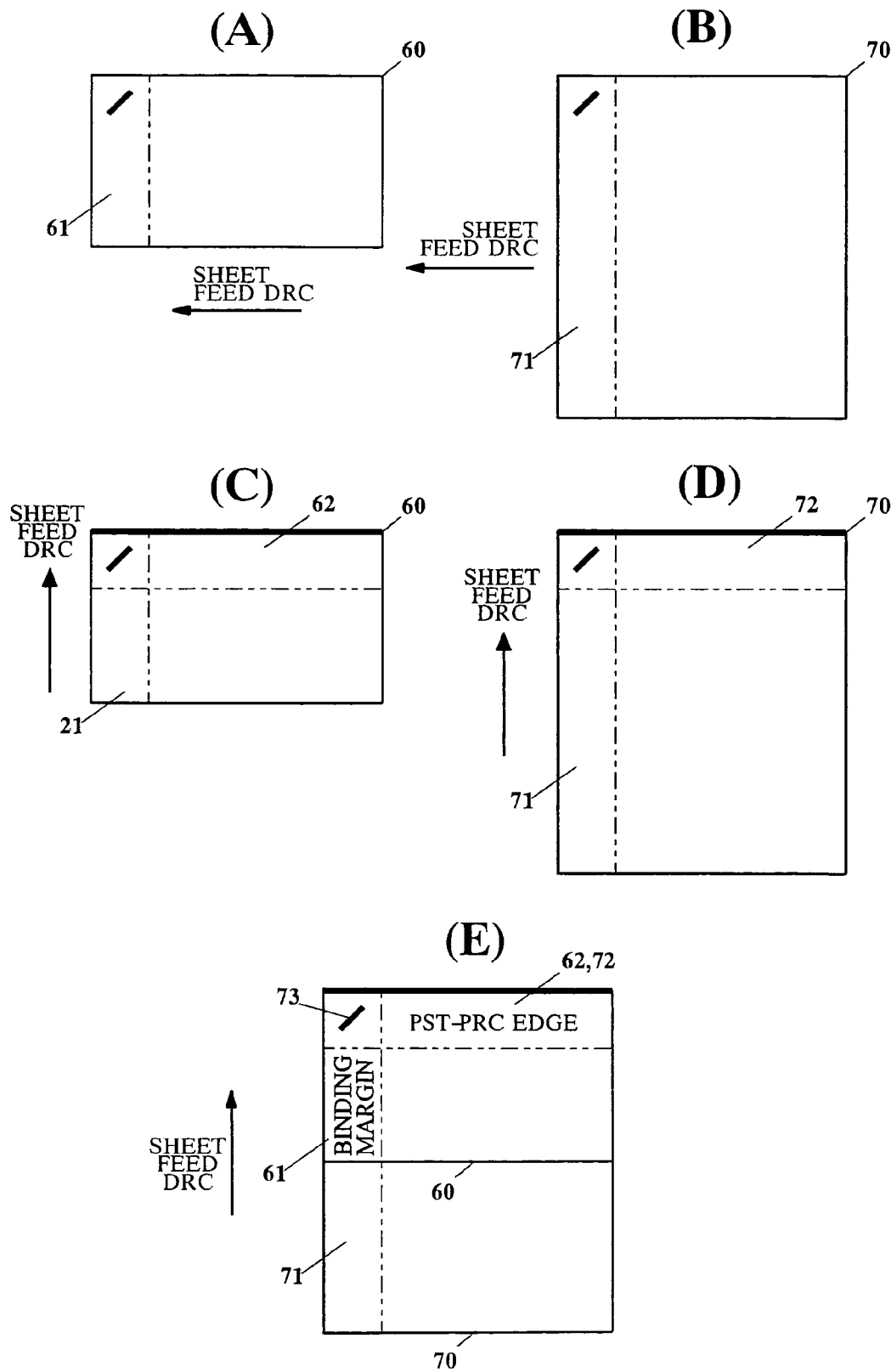
FIG. 20 is an illustration showing a case where both of a post-processing-edge and a sheet binding margin, which are different from each other, are designated as one-point stapling.

FIG. 20 is an illustration showing the example that both a post-processing-edge and a sheet binding margin, which are different from each other, are designated in the case of one-point stapling.

In order to make the direction of a small size sheet 60 and a large size sheet 70 consistent, the left edges of sheets 60 and 70 are set to be sheet binding margins 61 and 71. As in the prior art, if the direction which is perpendicular to the sheet binding margin is the sheet feed direction, the sheet 70 can not be transferred in a transverse direction depending on the kinds of the image forming apparatus 10 or the lengths of the long edge of the sheets 70. In addition, since the longitudinal lengths of the sheet binding margins 61 and 71 are inconsistent, the sheet staple-processing cannot be executed.

Meanwhile, if only one end of the sheet binding margins 61 and 71 is stapled by a staple 73 as shown in FIG. 20(E), the problem can be solved by changing sheet staple-processing position ST2 to ST0 (see FIG. 2) with setting the edges which is adjacent to the sheet binding margins 61 and 71, and is sheet staple-processing position side, to be the post-processing-edges 62 and 72, respectively, as shown in FIGS. 20(C) and (D). FIG. 20(E) shows post-processing-edges 62 and 72 overlapped with each other by arranging their long edges being identical in length.

Figure 21:
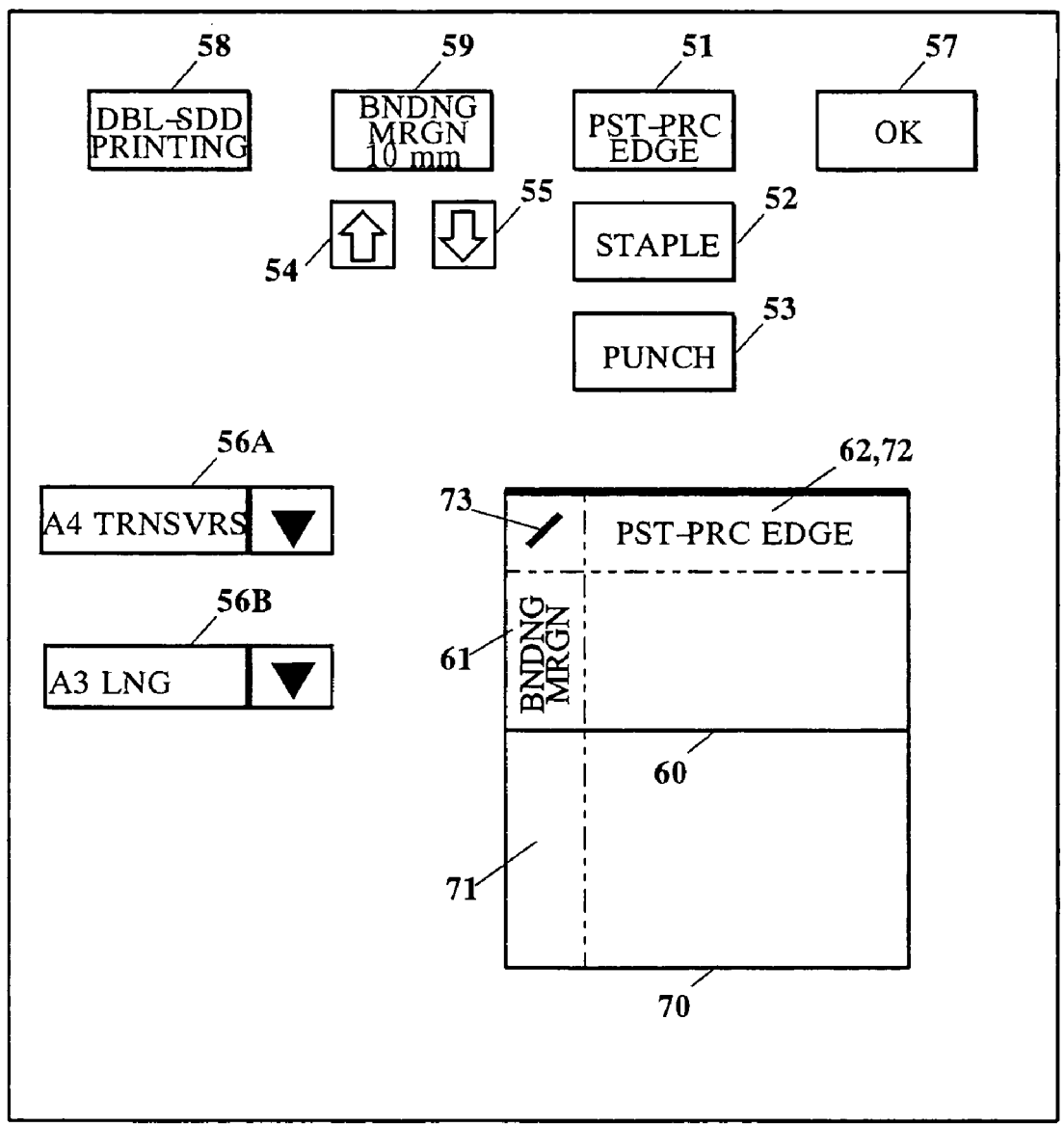
FIG. 21 is a diagram showing a setting screen related to the designation of a sheet binding margin and a post-processing-edge.

FIG. 21 shows a setting screen related to the designation of a sheet binding margin and a post-processing-edge, this is displayed on a touch panel provided in the operation section 44.

The sheets 60 and 70 with sizes set in an application are overlapped and displayed on the screen.

A duplex/single-sided printing button 58 is a software toggle switch button with which the single-sided printing and the double-sided printing are switched in turn whenever touching it.

Whenever touching a sheet binding margin button 59, the inside of its rectangular region is displayed in white-black reverse. When the sheet binding margin button 59 is a negative image condition, the position of the sheet binding margin can be designated. Then if the edge of the sheet 60 or 70 is touched, the edge of the sheet 60 or 70 corresponding to the touch is selected as the sheet binding margins 61 and 71. At the same time, the edges of both sheet binding margins are indicated to be consistent, and the border line of the sheet binding margins and the letter of 'the sheet binding margin' are indicated. The width of the sheet binding margin is indicated on the sheet binding margin button 59, and its value is increased by 1 mm whenever touching an increment button 54 and decreased by 1 mm whenever touching a decrement button 55.

Likewise with the case of the sheet binding margin 59, whenever touching the post-processing-edge button 51, the inside of its rectangular region is displayed in white-black reverse. When the post-processing-edge button 51 is a negative image condition, the post-processing-edge can be selected. Then, if the edge of the sheet 60 or 70 is touched, the edge of the sheet 60 or 70 corresponding to the touch is selected as the post-processing-edges 62 and 72. At the same time, both post-processing-edges are indicated to be consistent, and the border line of the post-processing-edges and the letter of 'the post-processing-edge' are indicated. The width in width direction of the post-processing-edge is equal to that of the sheet binding margin.

The sizes and directions of the sheets 60 and 70 selected in the application are indicated on sheet selecting combo boxes 56A and 56B. When touching an arrow indication, a pull-down list menu can be displayed to change the sizes and directions of the sheets to others.

When touching an OK button 57, the value set in the screen is stored and fixed in the setting information memory 42 of FIG. 1.

Since the post-processing-edge and the sheet binding margin are designated at a time as described above, even though the sheets of different sizes are included in a single printing job, the sheet turning-over directions are determined on the basis of one of the designated post-processing-edge and the sheet binding margin, the sheet turning-over directions are unified with reference to the stack of sheets after printing.

Generally, the sheet setting may be executed by a host computer HC, and this can equally be applied to the present embodiments. That is, the setting screen such as FIG. 21 is displayed by driving the printer driver installed in the host computer HC. In this case, the setting may be made through click operation by pointing on the display screen using the pointing device and click operation, not the touch panel. In the case where the setting is made by both the host computer HC and the image forming apparatus 10, the host computer HC essentially has a priority for the setting. As an exception, if the image forming apparatus 10 is set to be a priority for the setting, the setting is made by the image forming apparatus 10.

Figure 22:
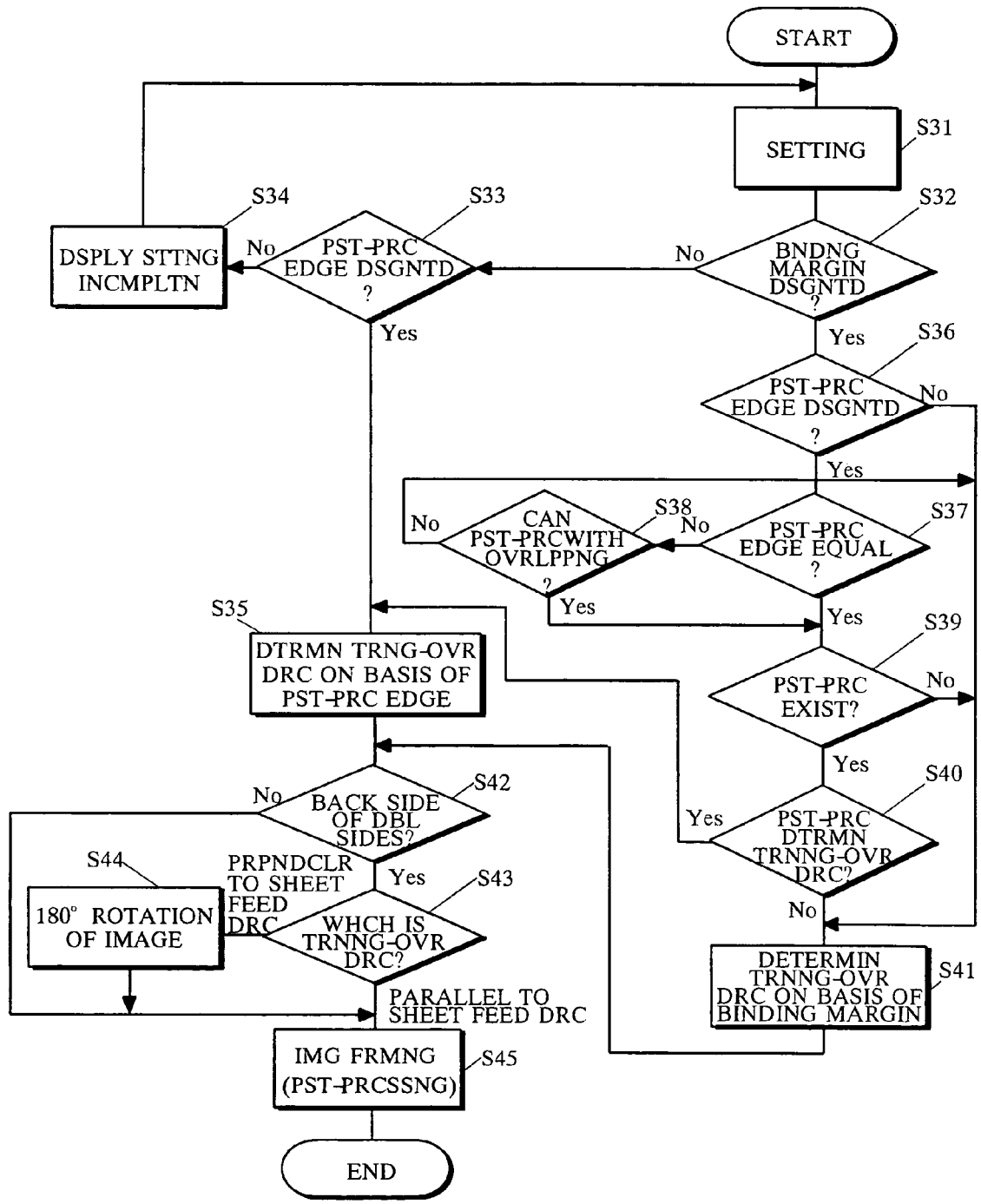
FIG. 22 is a flow chart mainly of a sheet turning-over executed by the system controller.

FIG. 22 is a flow chart mainly showing a process which determines the turning-over direction order by a system controller 40. The signs in parenthesis represent reference signs for identifying steps in FIG. 22.

(S31) Execute the settings of FIG. 21 and others such as the sheet feeding tray on the setting screen of the printer driver PD. If a printing start button (not shown) on the setting screen is pressed, the image information including the setting information is provided to the image forming apparatus 10 by the host computer HC, and the system controller 40 stores it in the image information memory 41 and then the process in FIG. 22 goes to step S32.

The processing for determining the sheet turning-over direction will be described below depends on criteria as follows:

(a) Essentially determining the sheet turning-over direction on the basis of the sheet binding margin (S41).

(b) If the position of the sheet binding margin is not designated and only the post-processing-edge is designated, then determining the sheet turning-over direction on the basis of the post-processing-edge (S35).

(c) In the case where both the sheet binding margin and the post-processing-edge are designated, when the positioning of the sheet binding margin is estimated to be wrong, determining the sheet turning-over direction on the basis of the post-processing-edge.

(S32) If the sheet binding margin is not designated, then the process goes to step S33, or else goes to step S36 by the system controller 40.

(S33) If the position of the post-processing-edge is not designated, then the process goes to step S34, or else that is, only if the position of the post-processing-edge is designated, the process goes to step S35 by the system controller 40 with reference to the contents in the image information memory 41.

(S34) Since the sheet turning-over direction can not be determined, the system controller 40 makes the operation section 44 to display that the setting is uncompleted, and then the process is returned to step S31. In this case, since the image information is already stored in the image information memory 41, the setting is made in the operation section 44 of the image forming apparatus 10 in step S31. The setting information is temporarily stored in the setting information memory 42 by the system controller 40, and if the setting is completed, the setting value adds to the image information in the image information memory 41.

(S35) The system controller 40 determines the sheet turning-over direction on the basis of the information on the post-processing-edge included in the contents of the image information memory 41. That is, the direction which is perpendicular to the designated post-processing-edge is determined as the sheet turning-over direction. However, if the contents of the image information memory 41 have the information designating the sheet turning-over direction for a specific page, the sheet turning-over direction for the specific page corresponds to the designation. For example, if the portrait image is designated at a time but the transverse width of a table in a certain page is wide and is designated as a landscape image, the sheet turning-over direction of the page is perpendicular to the sheet turning-over direction of other page. The designation is executed by the user in an application.

Figure 24:
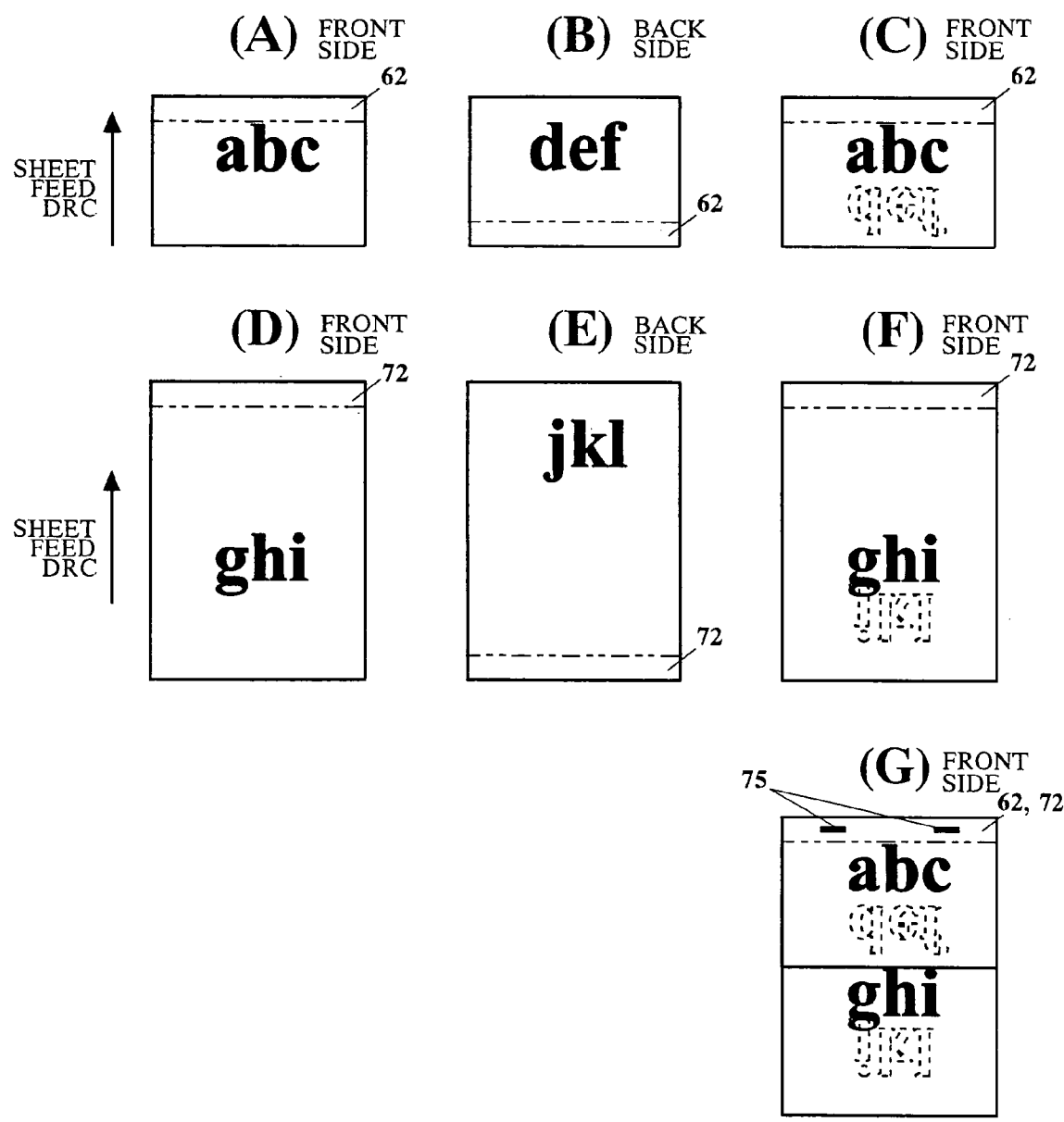
FIG. 24 is an illustration for FIG. 22, showing a case where in a single printing job, sheets of different sizes having a equal length of edge are used, a double-sided printing is executed, and a stack of sheets is two-point stapled by designating only a post-processing-edge of the post-processing-edge and a sheet binding margin.

FIG. 24 is an example showing the case where in a single printing job, sheets of different sizes with long edge being identical in length are used and a double-sided printing is executed and a stack of sheets is two-point stapled by designating only the post-processing-edge from between a post-processing-edge and a sheet binding margin. Each of FIGS. 24(A) and 24(D) shows the image directions formed on the surface of small size and large size sheets as a string of letters, and at the same time, shows that the post-processing-edges are upper edges of a small size sheet which is set to be transverse small size sheet and a large size sheet which is set to be longitudinal. Each of FIGS. 24(B) and 24(E) shows the image directions formed on the back sides of small size and large size sheets (the back side is a surface whose upper and lower is reversed corresponding to the surface reversed by switching back the sheets in order to write the back side after writing the surface image in the image forming apparatus 10) as a string of letters, respectively. Each of FIGS. 24(C) and 24(F) shows the surface images on the small size and the large size sheets with the image of the back side shown with dotted line, respectively. FIG. 24(G) shows a two-point stapling condition by making the post-processing-edges of FIGS. 24(C) and 24(F) consistent and overlapping.

Next, the process goes to step S42.

(S36) If the post-processing-edge is not designated, that is, only the sheet binding margin is designated, then the process goes to step S41, or else it goes to step S37.

Figure 23:
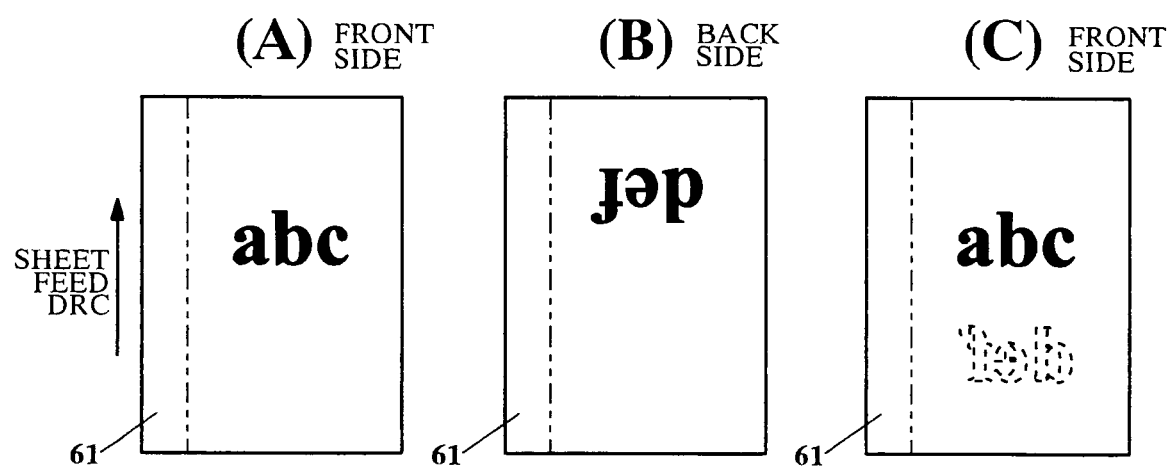
FIG. 23 is an illustration for FIG. 22, showing a case where in a single printing job, sheets of the same size are used, and only a sheet binding margin of a post-processing-edge and the sheet binding margin is designated.

FIG. 23 is a view showing the case where in a single printing job, sheets with the same size are used, and only the sheet binding margin from a post-processing-edge and a sheet binding margin are designated. In this case, the process goes from step S36 to step S41.

Figure 27:
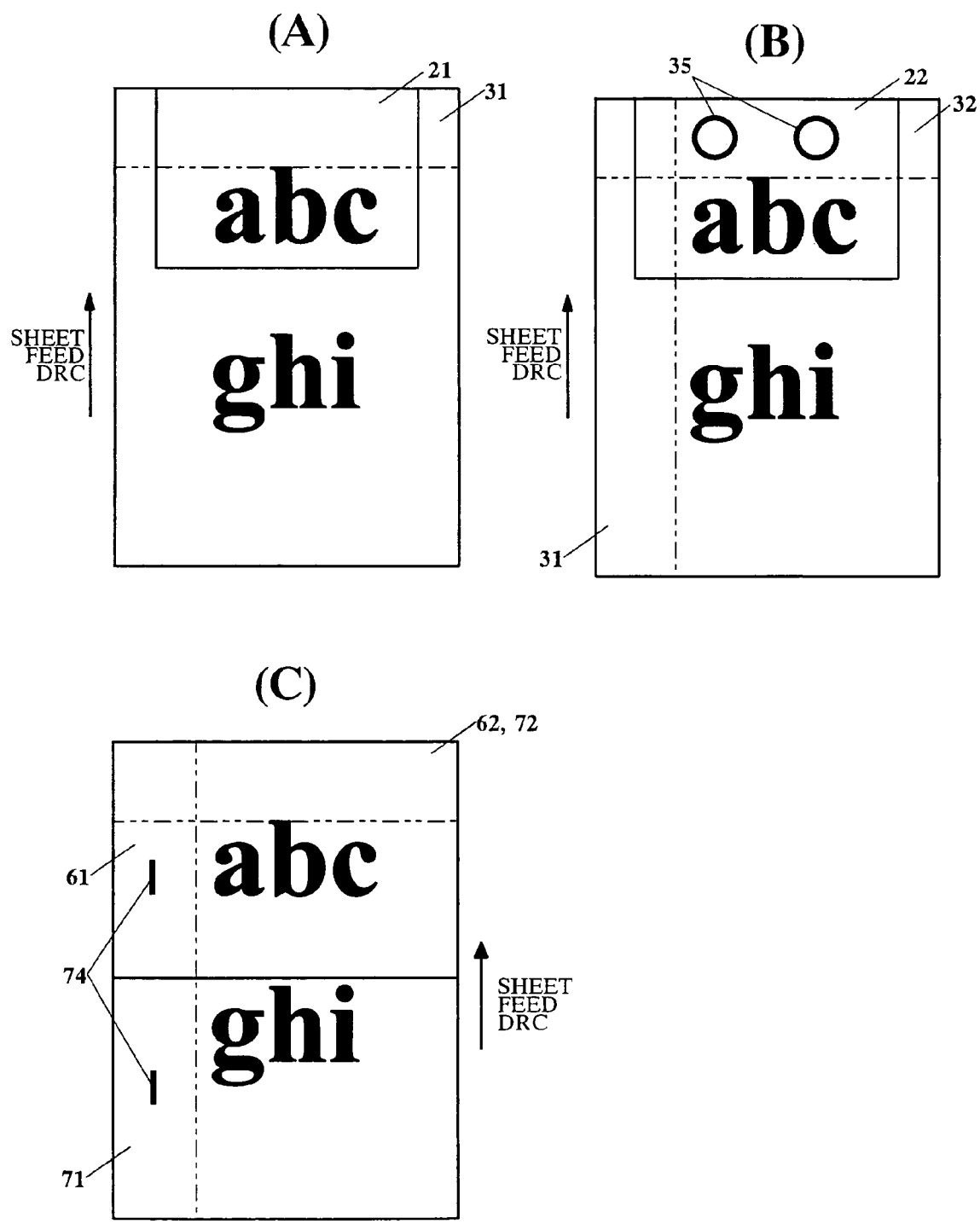
FIG. 27 is an illustration for FIG. 22, showing a case where in a single printing job, sheets of different sizes not having a equal length of edge are used, only the sheet binding margin of the post-processing-edge and the sheet binding margin is designated, and a sheet post-processing is not designated.

FIG. 27(A) is a view showing the case where in a single printing job, sheets of different sizes with long edge being not identical in length are used, only the sheet binding margin from between a post-processing-edge and a sheet binding margin is designated and a sheet post-processing is not designated. In this case, it proceeds from step S36 to step S41 and after completing the printing job, the two-hole punch-processing can manually be made.

Even though the sheet post-processing is designated, it is considered to be suitable for determining the sheet turning-over direction on the basis of the designation of the sheet binding margin if the sheet post-processing can not be made. Therefore, steps S37 and S38 to be described below determine whether the sheet post-processing can be made or not and if not, the process goes to step S41.

(S37) If the lengths of the post-processing-edges of the sheets with different sizes are equal to each other, then the process goes to step S38, or else goes to step S39.

(S38) If the post-processing-edges of the sheets with different sizes can be post-processed with overlapping, then the process goes to step S39, or else goes to step 41 by changing a presence of the sheet post-processing to an absence (changing to an absence of the sheet staple-processing or an absence of the sheet punch-processing).

FIG. 27(B) is a view showing the case where in a single printing job, sheets of different sizes with any edge being not identical in length are used, both a post-processing-edge, and a sheet binding margin are designated and a two-point punch-processing is executed on every sheet. In this case, the designation of the post-processing-edge is wrong and the process goes from step S38 to steps S39, S40, and S35.

FIG. 27(C) is a view showing the case where in a single printing job, sheets of different sizes with a edge being identical in length are used, a double-sided printing is executed, and a stack of sheets is two-point stapled by designating both a post-processing-edge and a sheet binding margin. In this case, the designation of the sheet post-processing is wrong, and the process goes from step S38 to step S41 and after completing the printing job, the sheet binding margins 61 and 71 can manually be stapling processed or two-hole punching processed.

(S39) If the sheet staple-processing or sheet punch-processing are designated, that is, if the sheet post-processing is executed by the stapling apparatus 161 or the punching apparatus 162, the process goes to step S40, or else, that is, even though the post-processing-edge is designated, if the staple position is not designated and also the absence of the punching is selected, the process goes to step S41.

(S40) If the sheet post-processing determines the sheet turning-over direction, that is, if the two-hole punching or two-point stapling is designated as the sheet post-processing in the present embodiments, it proceeds to step, S35 and if not, proceeds to step S41.

Figure 25:
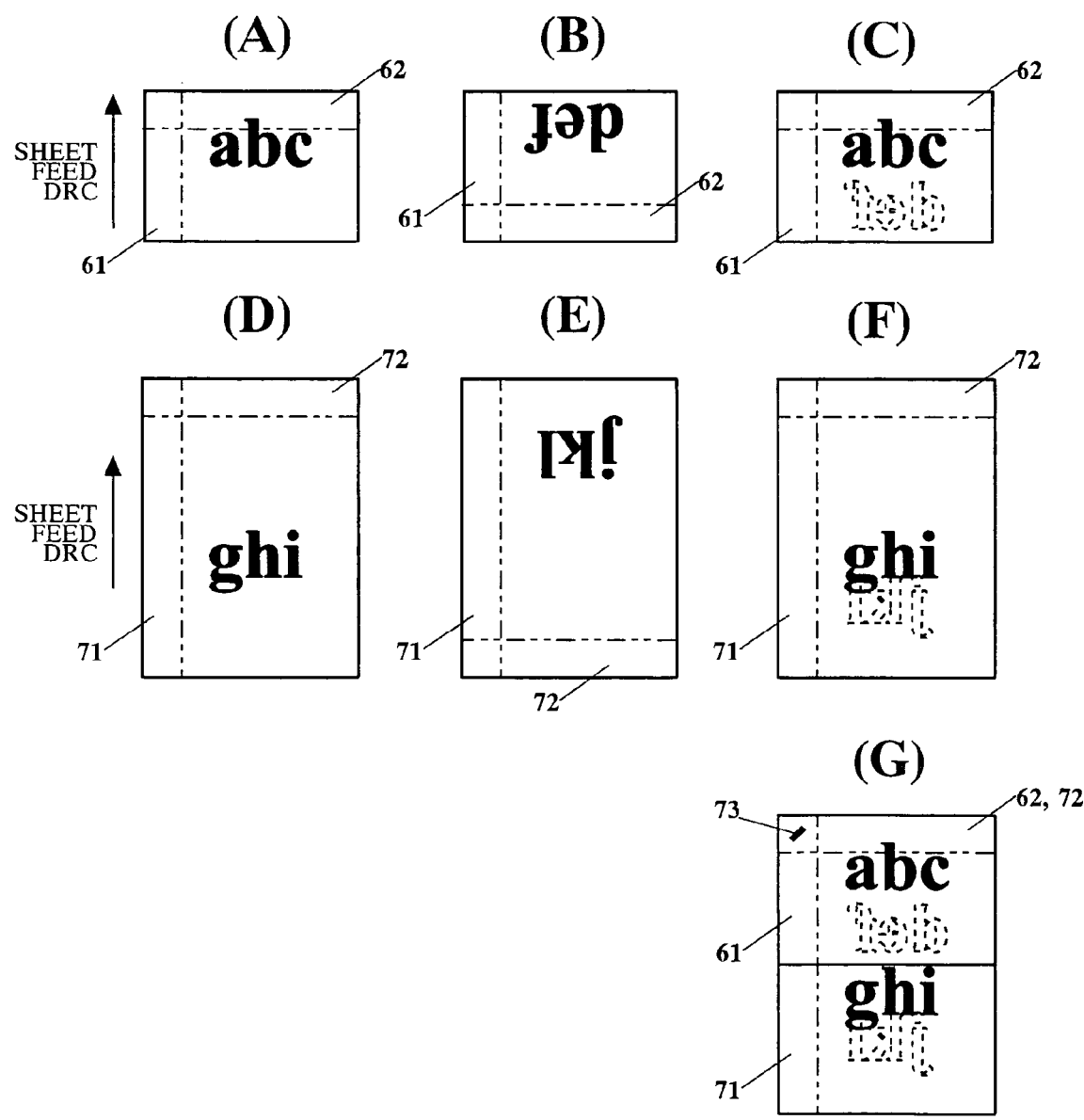
FIG. 25 is an illustration for FIG. 22, showing a case where in a single printing job, sheets of different sizes having a equal length of edge are used, a double-sided printing is executed, and a stack of sheets is one-point stapled in a corner by designating both of the post-processing-edge and the sheet binding margin.

FIG. 25 is a view showing the case where in a single printing job, sheets of different sizes with any edge being identical in length are used and a double-sided printing is executed and a stack of sheets is one-point stapled in a corner with designating both a post-processing-edge and a sheet binding margin. In this case, the process goes from step S40 to step S41. FIGS. 25(A) to (G) corresponds to FIGS. 24(A) to (G), respectively.

Figure 26:
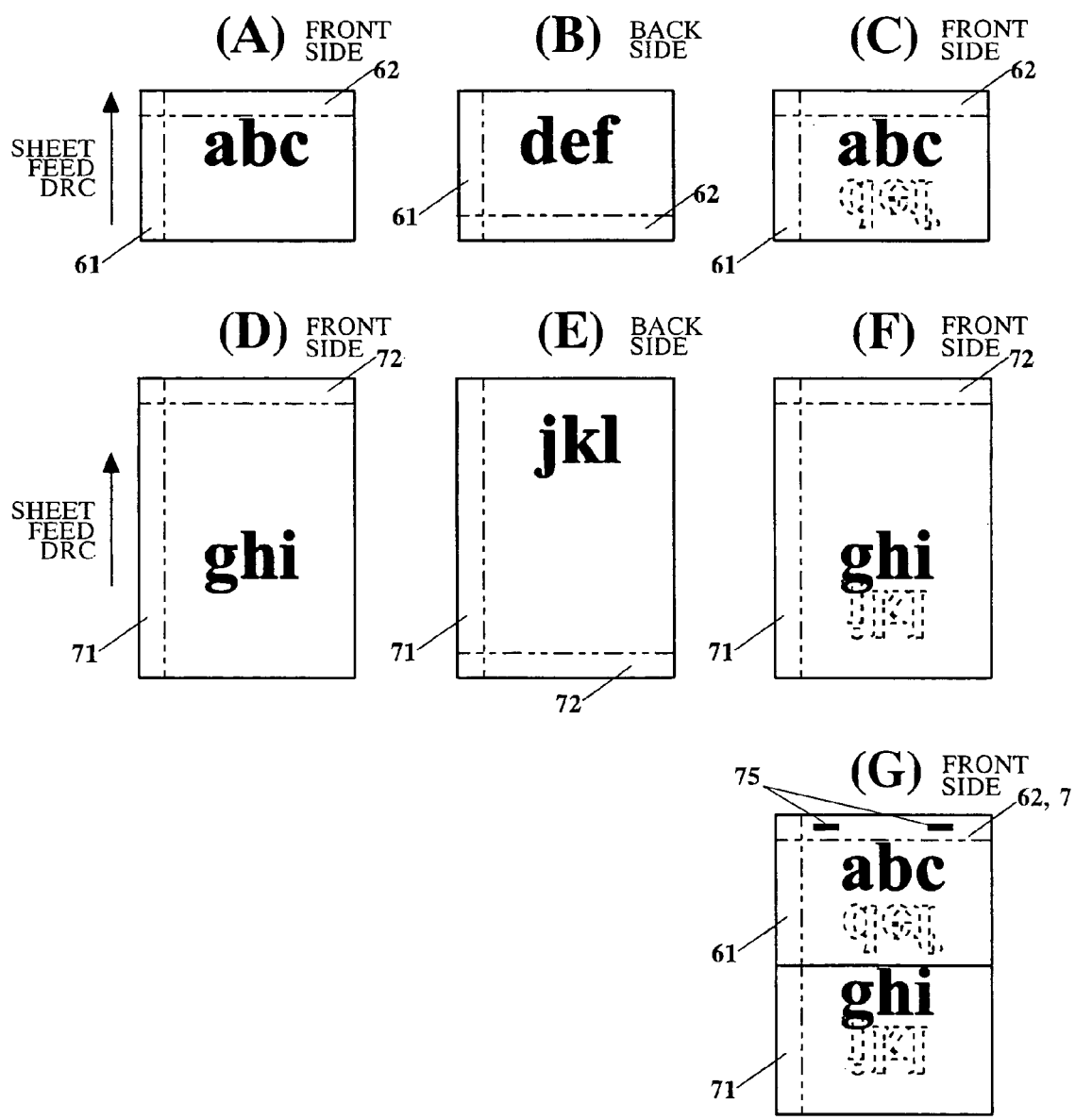
FIG. 26 is an illustration for FIG. 22, showing a case where in a single printing job, sheets of different sizes having a equal length of edge are used, a double-sided printing is executed, and a stack of sheets is two-point stapled in a long edge of a small size sheet by designating both the post-processing-edge and the sheet binding margin.

FIG. 26 is a view showing the case where in a single printing job, sheets of different sizes with long edge being identical in length are used and a double-sided printing is executed and a stack of sheets is two-point stapled in a long edge of a small size sheet by designating both a post-processing-edge and a sheet binding margin. In this case, the positioning of the sheet binding margin is wrong and it proceeds from step S40 to step S35. FIGS. 26(A) to (G) corresponds to FIGS. 24(A) to (G), respectively.

(S41) The system controller 40 determines the sheet turning-over direction on the basis of the sheet binding margin information included in the contents of the image information memory 41. That is, the direction which is perpendicular to the long length direction of the designated sheet binding margin is determined as the sheet turning-over direction. However, likewise with the case of the step S35, if the information designating the sheet turning-over direction for the specific page is included in the contents of image information memory 41, the sheet turning-over direction for the specific page is selected on the basis of the designation.

(S42) In the case of the back side of the double-sided printing, the process goes to step S43, or else goes to step S45.

(S43) If the sheet turning-over direction determined in step S35 or S41 is perpendicular to the sheet feed direction, the process goes to step S44, or else, that is, the sheet turning-over direction is parallel to the sheet feed direction, goes to step S45.

(S44) Changing the image information in the image information memory 41 so as the image is rotated by 180°.

(S45) The system controller 40 provides the contents of the image information memory 41 to the image writing section controller 45. Then the image writing section controller 45 makes the image writer 20 to form the image on the sheet in response to it. The system controller 40 responds the request from the image writing section controller 45 and transports the sheet to the sheet transporter through the sheet transport controller 46. In addition, the system controller 40 provides the sheet post-processing designation information to the sheet post-processing controller 47 and when the conditions which are capable of executing the sheet post-processing are made, the sheet post-processing controller 47 executes the sheet post-processing in response to the request provided by the sheet transport controller 46. The stapling apparatus 161 or the punching apparatus 162 executes the sheet post-processing on the basis of the sheet post-processing designation information.

Others are the same as the first embodiment of the present invention as above.

As mentioned above, according to the third embodiment of the present invention, the sheet turning-over direction of a plurality of sheets regarding the single job of image forming is automatically determined (steps S35 and S41) on the basis of either of the designations of the post-processing edge and the sheet binding margin position (steps S32 and S33), and if the sheet turning-over direction of the sheet is perpendicular to the sheet feed direction, the image on the back side of the sheet is rotated by 180° to change the image information (steps S42 to S44), whereby the invention can obtain an effect that the sheet turning-over direction can be designated as the user's intention corresponding to designating of a dyad of the post-processing-edge and the sheet binding margin.

In addition, even though the sheets with different sizes regarding the single printing job are included, the post-processing-edge and the sheet binding margin are designated at a time, taking off the exceptions described above, and the sheet turning-over direction is determined on the basis of either of the post-processing-edge and the sheet binding margin designated, whereby the invention can obtain an effect that the sheet turning-over directions for the stack of sheets are unified after printings.

Furthermore, even though the sheet binding margin is designated, the post-processing-edge is designated and the sheet post-processing-position is designated along the edge so that the sheet turning-over directions of the sheet can be determined uniquely. And in the case of executing the sheet post-processing (steps S39 and S40), the sheet turning-over directions of the plurality of sheets regarding the single job of image forming can be determined on the designation of the post-processing-edge (step S35). That is, in the case of considering the designation of the post-processing-edge rather than the designation of the sheet binding margin position to be proper, the sheet turning-over direction of the sheet can be automatically determined, whereby even though the designation is wrong, the sheet turning-over direction can be designated as the user's intention.

In addition, even though the designation is wrong, the sheet turning-over direction is determined by properly selecting and using the designation information and the image is rotated accordingly. Thus, even though the automatic sheet post-processing is not executed, the objects can be achieved by the manual sheet post-processing, resulting in obtaining an effect that the designation information can be used validly.

Moreover, in step S34 in FIG. 22, in the case where the error is not indicated and the setting is not sufficient, a pre-determined sheet turning-over direction becomes a sheet turning-over direction, for example, regarding the left edge as the sheet binding margin in spite of the case where other sizes are mixed, and the configuration that the process goes to step S42 may also be allowed.

In addition, even though the case where the automatic sheet post-processing apparatus mounted on the image forming apparatus is described, the configuration that does not comprise the automatic sheet post-processing apparatus and manually executes the sheet post-processing may also be valid.

Fourth Embodiment

An image forming apparatus according to a fourth embodiment of the invention will now be described.

Figure 28:
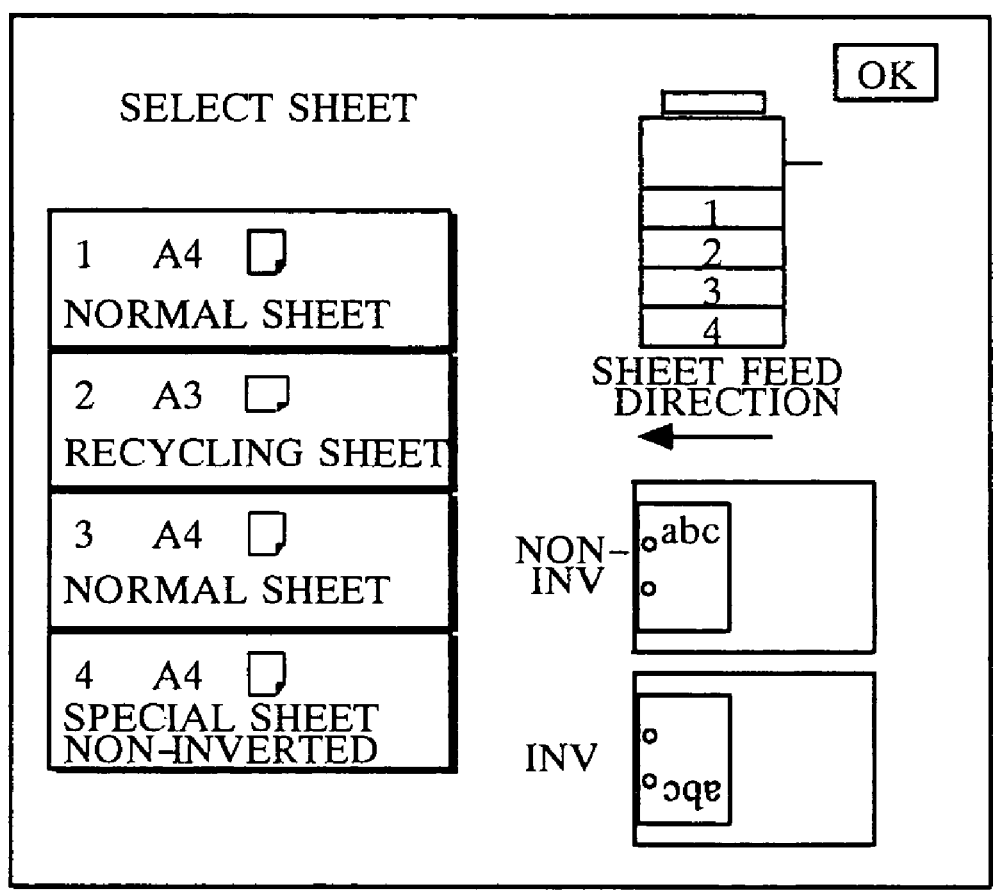
FIG. 28 is a plain view showing a sheet selecting screen displayed on the touch panel of the operation section in FIG. 1.

FIG. 28 is a view showing an example of a sheet selecting screen displayed on a touch panel of an operation section 44. Numerals 1 to 4 in FIG. 28 are numerals for identifying sheet feeding trays, wherein the respective numerals correspond to the sheet feeding trays 111 to 114 in FIG. 1, respectively. The size, direction and type of a sheet are indicated inside of rectangles indicating each of sheet feeding trays on the basis of the contents in the setting information memory 42.

Figure 29:
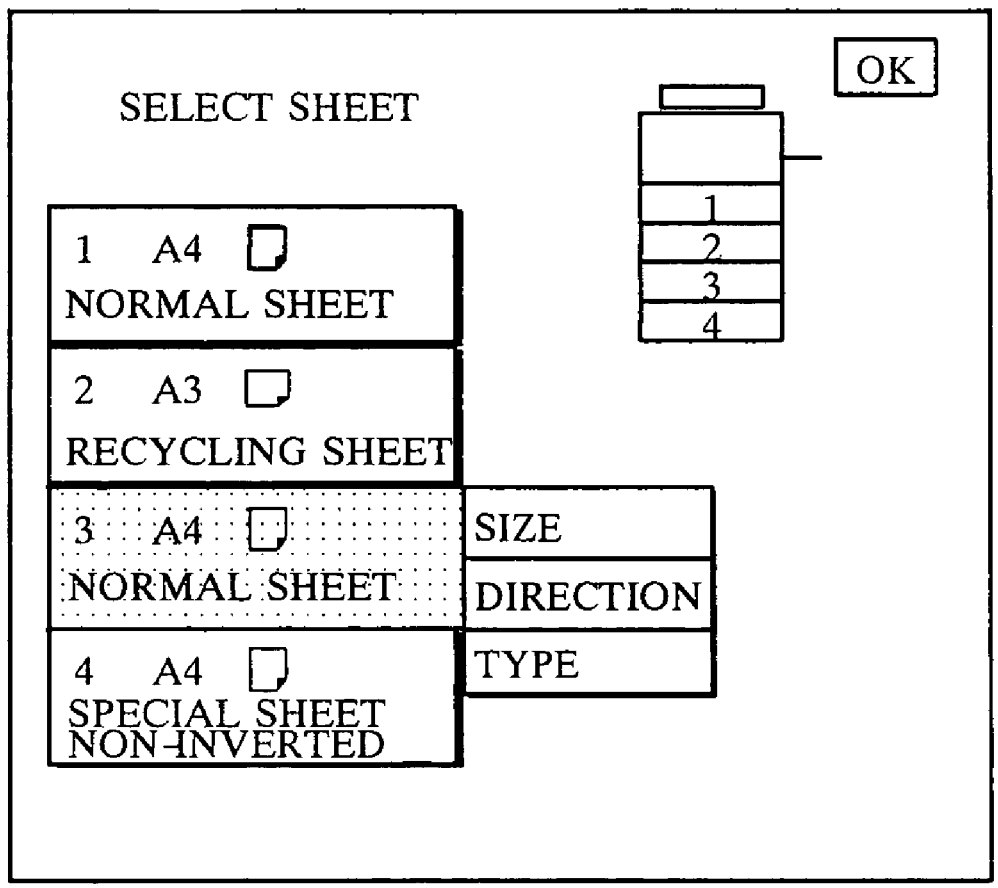
FIG. 29 is a screen view showing a sequel to FIG. 28 in a setting operation.
Figure 30:
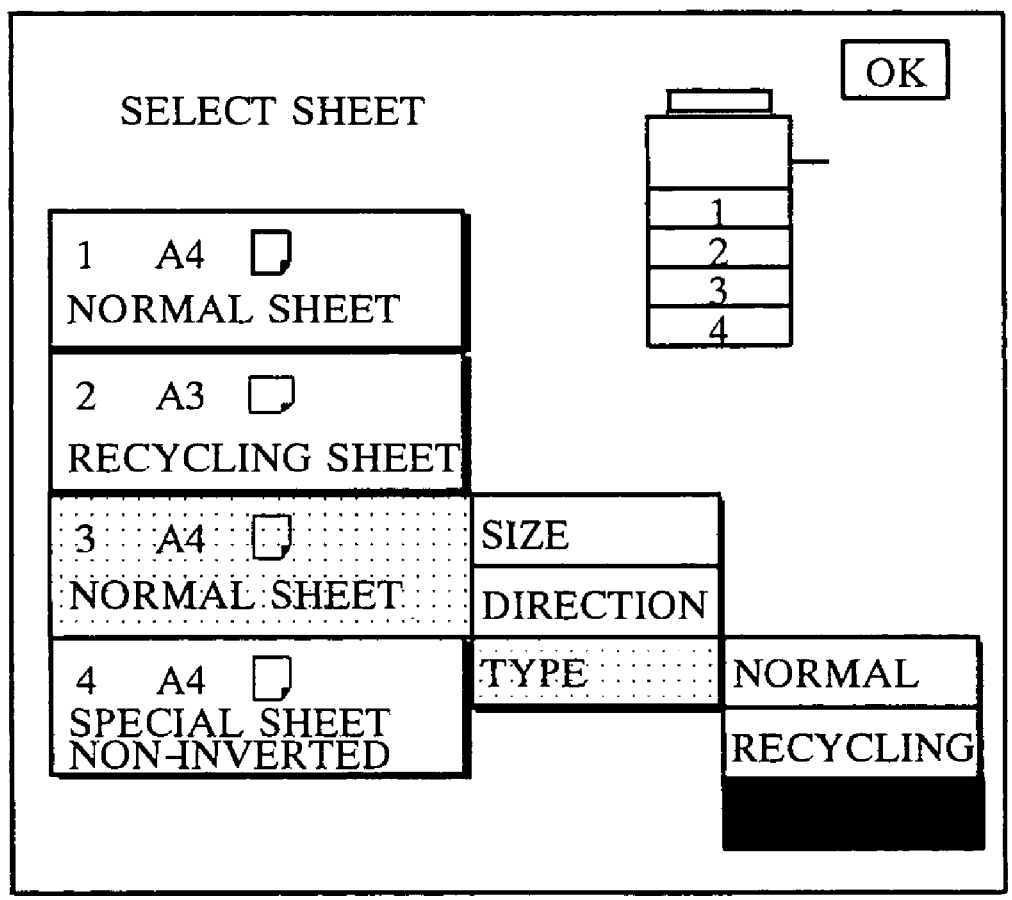
FIG. 30 is a screen view showing a sequel to FIG. 29 in a setting operation.

In the case of newly making a setting and changing the setting, for example, upon touching the inside of a rectangle indicating the feed tray 3, the selecting portion is displayed in white-black reverse as shown in FIG. 29 (dotted in FIG. 29, the same below) and a pull-down menu of the size, direction and type set in the sheet feeding tray 113 is displayed. In FIG. 29, upon touching the sheet feeding tray 3 again, the selecting portion is displayed in white-black reverse to make the condition of FIG. 28 (other selecting operations are the same as describe above). In the case of selecting the type of the sheet as in FIG. 29, the selecting portion is displayed in white-black reverse. At the same time, the pull-down menu of the lower layer is further displayed as shown in FIG. 30. Although many types are actually displayed, they are simply shown in FIG. 30. In FIG. 30, in the case where the special sheet is selected, the screen shown as FIG. 31 is displayed.

Figure 31:
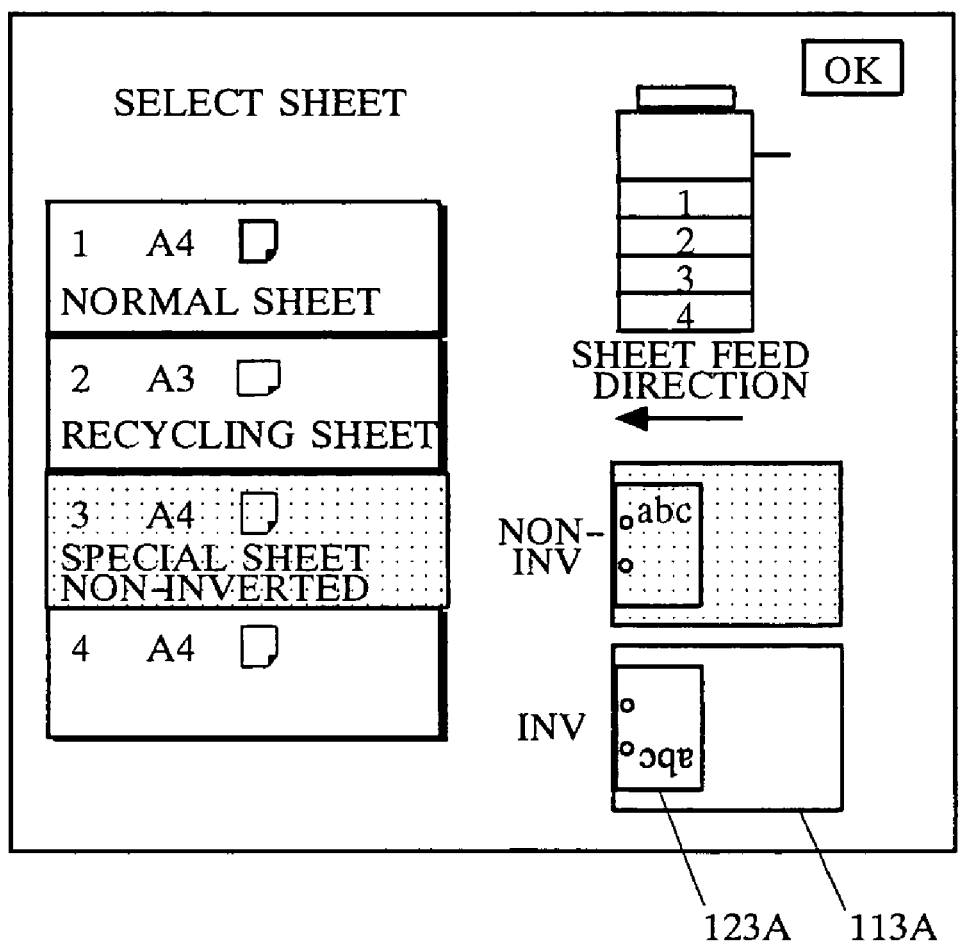
FIG. 31 is a screen view showing a sequel to FIG. 30 in a setting operation.

FIG. 31 shows images 113A and 123A corresponding to the sheet feeding tray 113 and the sheet 123 in FIG. 1, respectively. An 'abc' in the image 123A indicates the direction of image to be formed as a pre-printed image. Two O marks in the image 123A indicates a post-processing-edge, such as two-hole punching. 'Non-inverted' and 'inverted' in FIG. 31 correspond to FIGS. 39(A) and (B), respectively. Both conditions of the positive and turning-over are a front end of the sheet feed direction of the post-processing-edge of a special sheet. In addition, the 'inverted' is rotated by 180° against the 'non-inverted' in the direction of the image to be formed on the special sheet.

In FIG. 31, for example, upon touching the illustrating image of 'inverted', the illustrating image of the 'non-inverted' and 'inverted' is reversed in white-black. At the same time, the letter inside the rectangle indicating the sheet feeding tray, that is 'non-inverted' is changed into the 'inverted' and is the same as that shown in FIG. 32. Here, the set data is reserved in the work area of a memory. Upon touching an 'OK' button on right of a display screen, the set information is rotated and written in a setting information memory 42 from the work area. Then the 'inverted or non-inverted' information, etc., is updated.

If the special sheet set conditions to the sheet feeding tray is set by the GUI and the special sheet is set in the sheet feeding tray accordingly, the error of the set condition can be prevented. In addition, in two-way condition of the 'non-inverted' and 'inverted', if the special sheet is set in the feed tray, since the user only selects one of them. Therefore the operation is very easy and the error of the set condition can be prevented for a long time.

In general, the sheet setting can be executed by the host computer HC and also this can equally be applied to the present embodiments. That is, the setting screen such as FIG. 28 to FIG. 33 may be displayed by driving the printer driver installed in the host computer HC.

Figure 33:
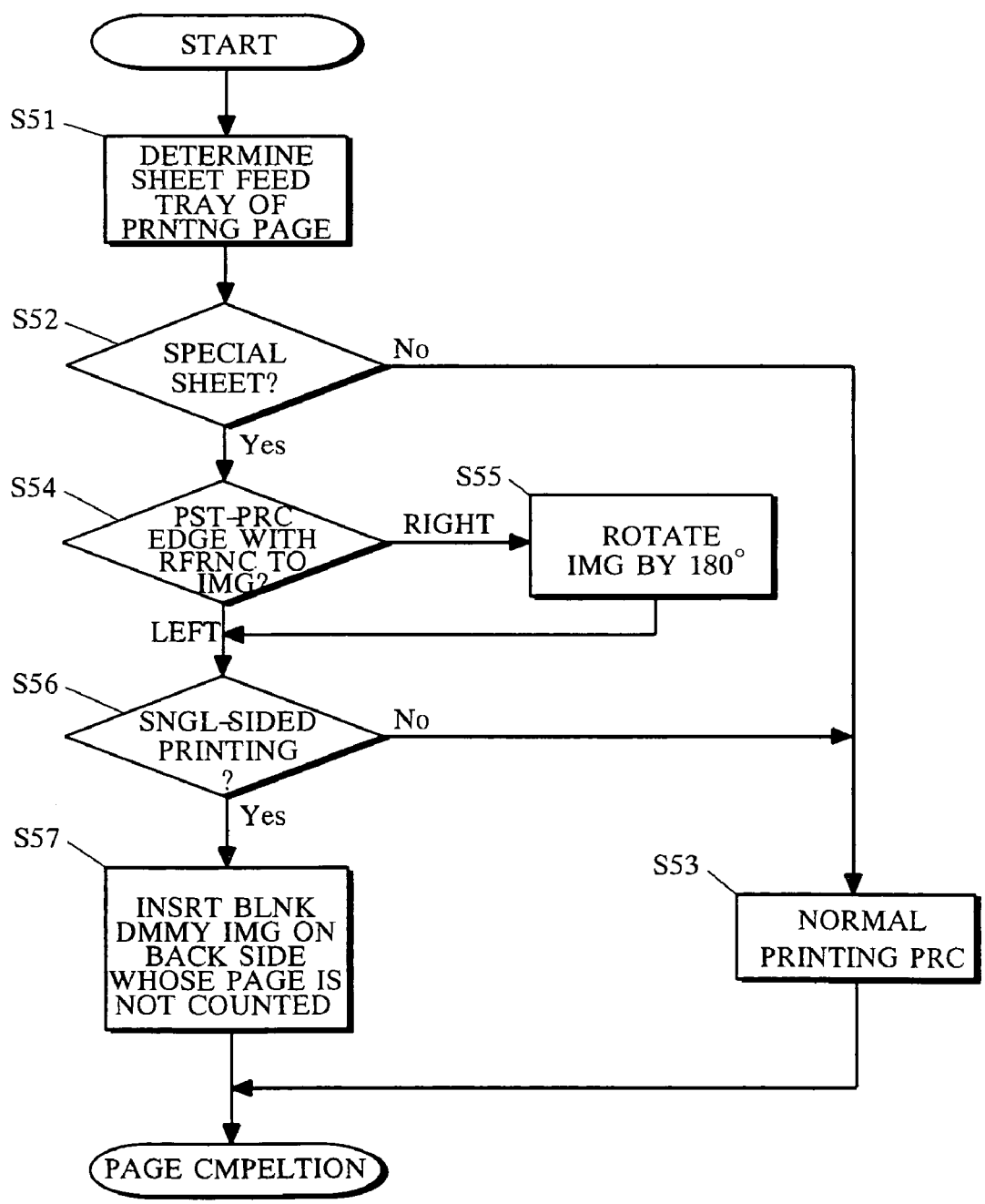
FIG. 33 is a flow chart showing a processing of any page after the system controller in FIG. 1 receives image information for printing from a host computer in a mixed mode of a double-sided printing and a single-sided printing, in a single printing job.
Figure 34:
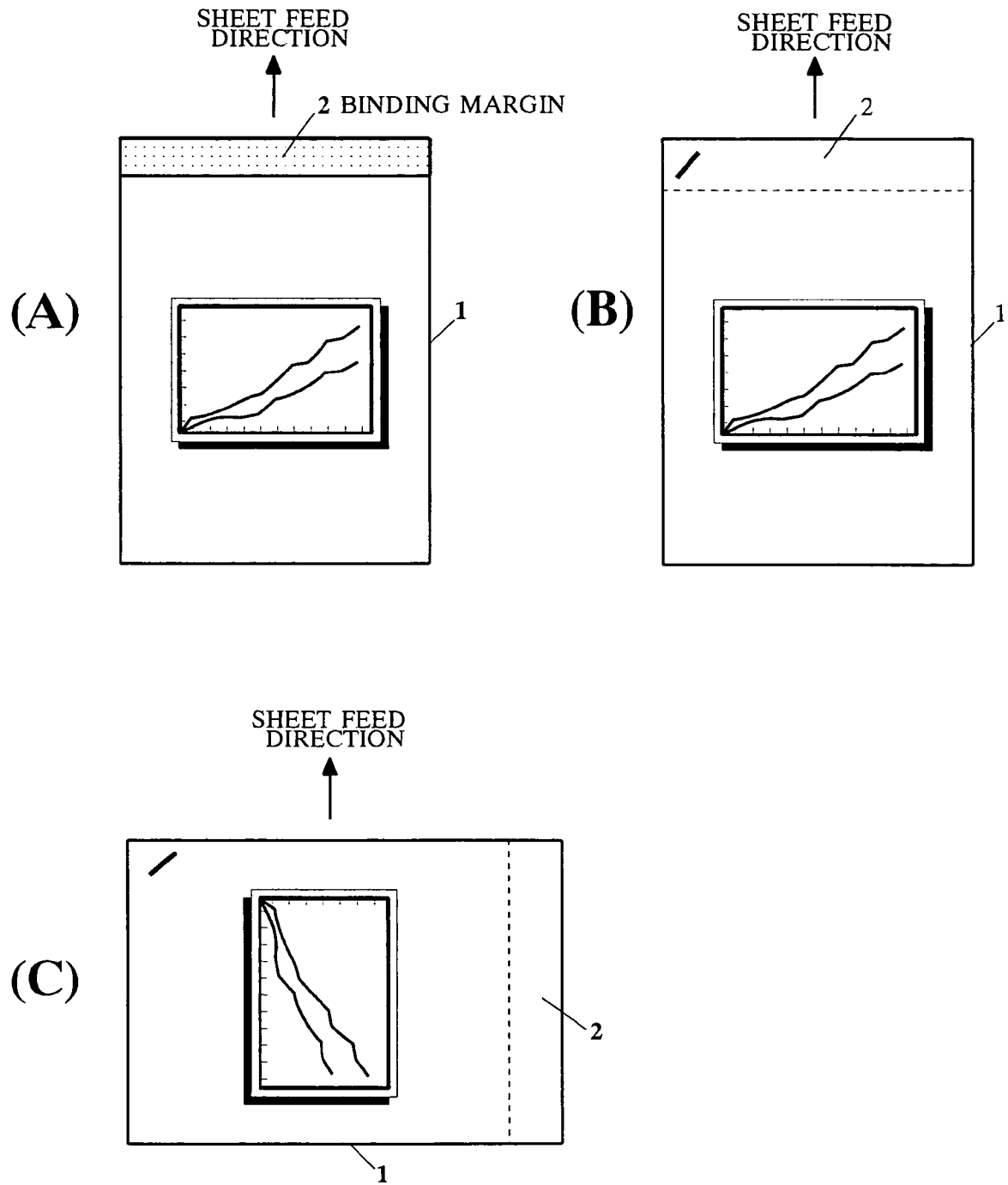
FIG. 34 is an illustration showing a problem of a prior art.
Figure 35:
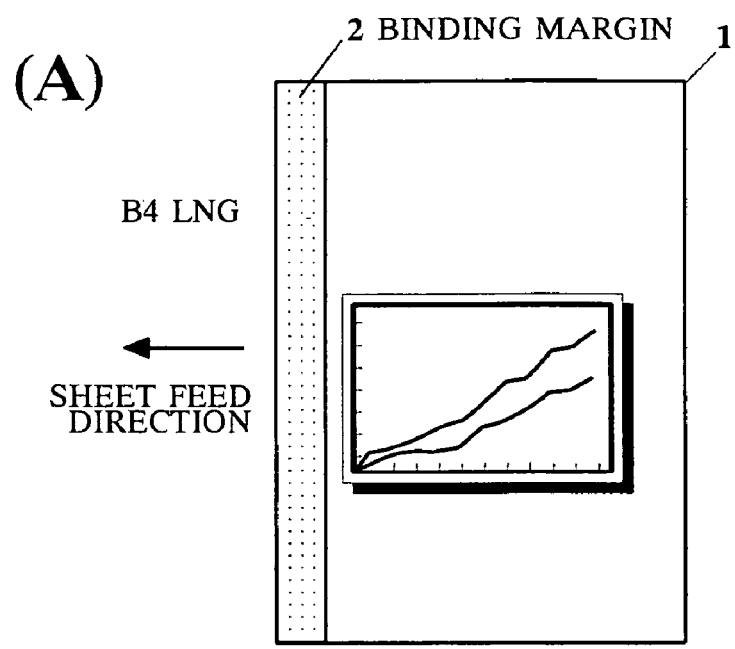
FIG. 35 is an illustration showing another problem of a prior art.
Figure 35:
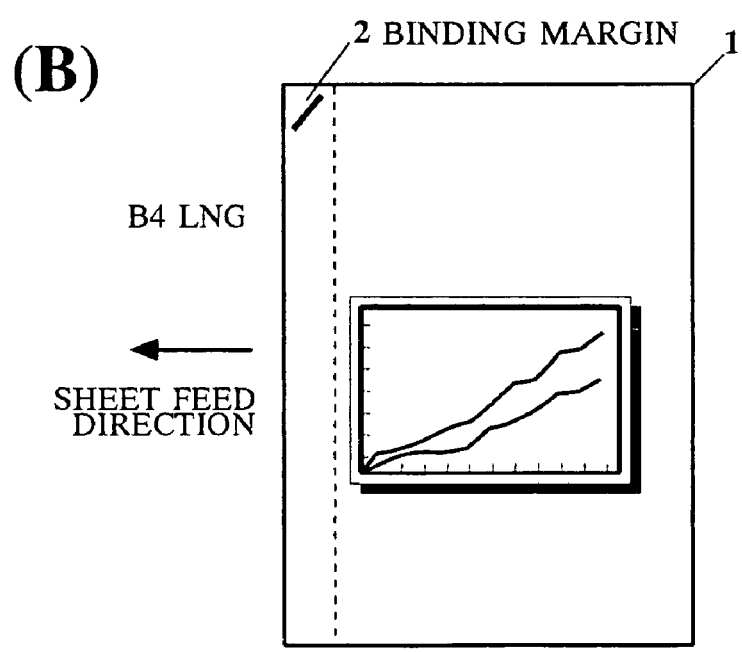
Figure 36:
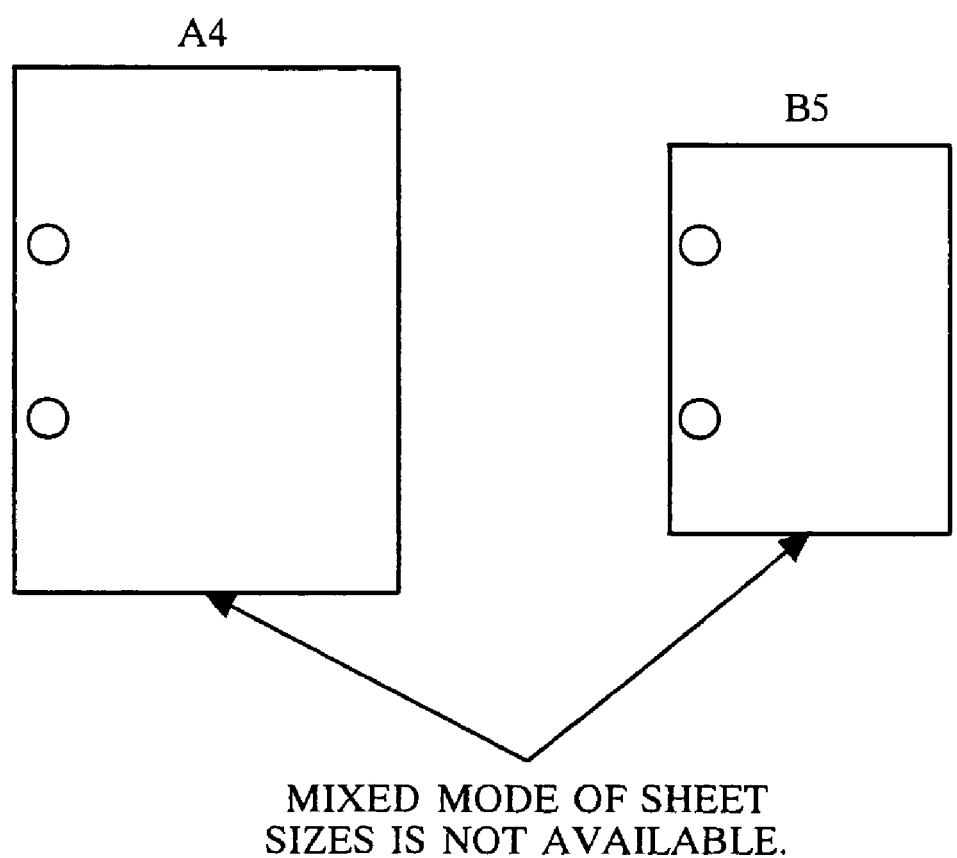
FIG. 36 is an illustration showing another problem of a prior art.
Figure 37:
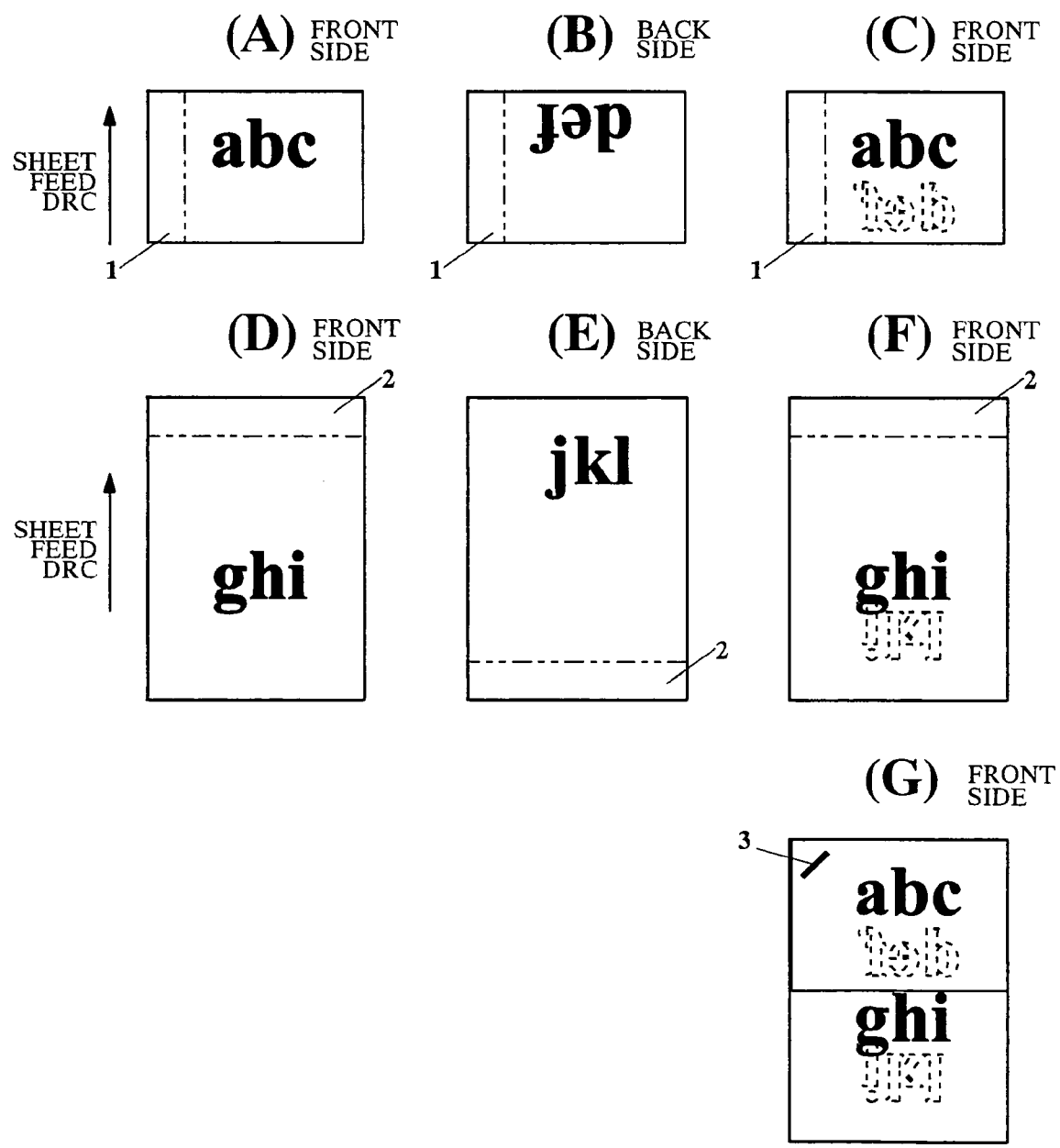
FIG. 37 is an illustration showing another problem of a prior art.
Figure 38:
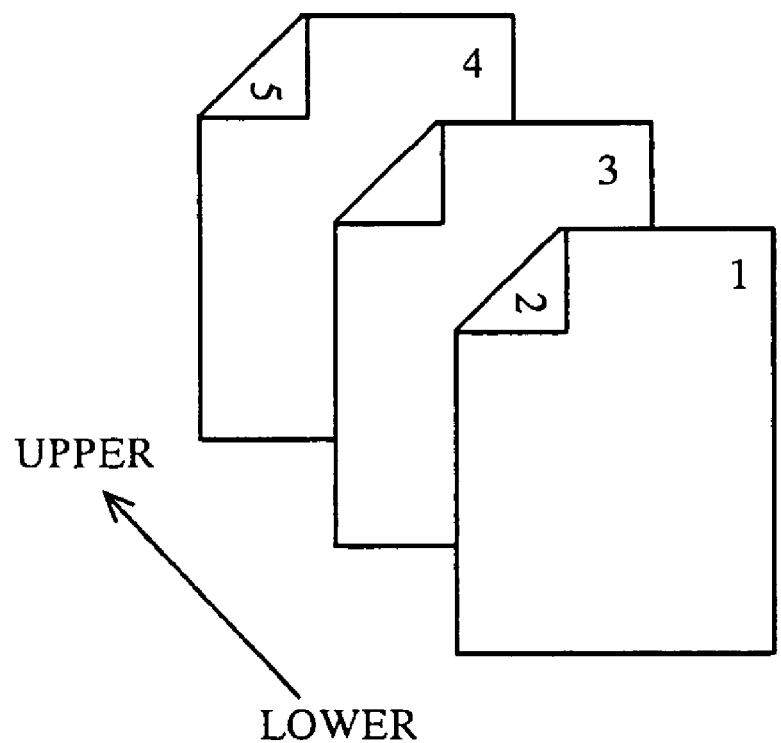
FIG. 38 is an illustration of another prior art.

FIG. 33 is a flow chart showing a processing of one page after a system controller receives image information for printing from a host computer in a mixed mode of a double-sided printing and a single-sided printing, in a single printing job. The signs in parenthesis represent reference signs for identifying steps in FIG. 33.

(S51) The system controller 40 determines the sheet feeding tray of the page to be printed.

Figure 32:
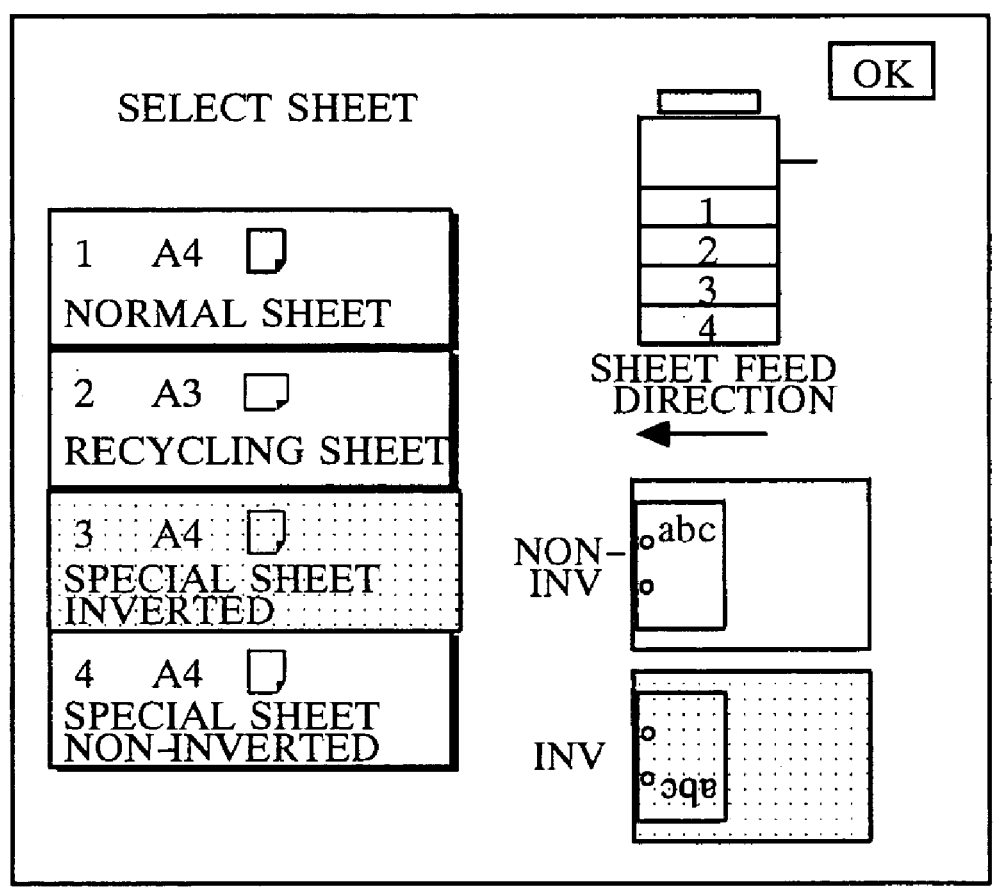
FIG. 32 is a screen view showing a sequel to FIG. 30 in a setting operation.

That is, in the case where the user acknowledges the sheet feeding tray through the setting screen such as FIG. 28 or FIG. 32 and selects it by the host computer HC, since the information thereabout is stored in the image information memory 41, the information is read to determine the sheet feeding tray.

In contrast, for example, a special sheet of A4 transverse is located in the sheet feeding trays 113 and 114, as shown in FIG. 32. In the case where the condition of the sheet is set as above, when the settings in the host computer HC are the page A4 transverse, a special sheet, and a presence of two-hole punching in a long edge and the right of the post-processing-edge (right of the sheet binding margin), it is judged to be 'non-inverted'. However, if the settings in the host computer HC are the page A4 transverse, the special sheet, and a presence of the two-hole punching in a long edge and the left of the post-processing-edge (left of the sheet binding margin), it is judged to be 'inverted'. Referring to the contents of the setting information memory 42, each case is determined to be the sheet feeding trays 113 and 114. That is, the system controller 40 determines the conditions of the 'non-inverted' and the 'inverted' simultaneously with determining the sheet feeding tray. Thus, the sheet post-processing set by the user is consistent with the sheet post-processing to be set based on the conditions of the 'non-inverted' and the 'inverted'.

According to the processing as above, it is accurately and easily determined if a special sheet of any set condition is used, without the user directly selecting the sheet feeding tray for the special sheet.

(S52) If the printing sheet of the page is set to a special sheet, then the process goes to step S54, or else goes to step S53 by the system controller 40.

(S53) Execute the normal printing process without inserting the blank sheet image on the dummy page as described above, and then end the processing of the page. That is, in the case of the single-sided printing except for the special sheet, it passes through the image writing section 20 only once and is discharged onto the sheet discharge tray 15. In addition, in the case of the double-sided printing, the back side is firstly printed, and then returned to the starting step in FIG. 33 to process the steps S51 to S53. In the step S53, the switch back for the surface page is executed.

In a general processing, the system controller 40 adds or changes (if there is no corresponding sheet, this sheet is changed to an alternative sheet, etc.) the contents in the image information memory 41 depending on the image information in the image information memory 41 and provides it to the image writing section controller 45. At the same time, executes the sheet transport control for the transport roller controller 46. The image writing section controller 45 deploys PDL description image through a bit map on the basis of the image information and controls a laser beam LB through on/off on the basis of the bit map data while scanning the laser beam LB onto a photosensitive drum 21, thereby forming a desired electrostatic latent image on the photosensitive drum 21.

(S54) The process goes to steps S55 and S56 by the system controller 40, depending on whether the image to be formed is right or left with reference to the special sheet set in the selected sheet feeding tray, that is, the contents in the step S52 is affirmative or negative.

(S55) The system controller 40 adjusts the information for rotating the image of page to 180° in the image information memory 41 (the information of a rotation angle 0° is changed to 180°).

(S56) With reference to the contents of the image information memory 41, it judges whether the page is the single-sided printing or the double-sided printing and if it is the single-sided printing, the process goes to step S57, or else goes to step S53.

(S57) For the contents of the image information memory 41, the system controller 40 adds a blank dummy image on the back side as described above to the image information of the single-sided printing and executes the double-sided printing. And then it executes the same processing as the step S53 on the dummy page thereof. However, it is different from a typical processing in that the sheet count by the sheet discharge sensor 17 is not executed in this case. When returning to the starting step in FIG. 33 and processing the next page (a surface page on an opposite side of the dummy page), it is judged to be the double-sided printing in the step S56 and the process goes to the step S57.

Others are the same as the first embodiment of the present invention as above.

According to the fourth embodiment, since the image forming apparatus forms the image on the special sheet so that the direction of the image to be formed on the provided special sheet is designated, on the basis of the special set information, which indicates substantial set conditions for the sheet feeding tray for the special sheet to be pre-processed, so that the direction of the image to be formed can be designated, and, the error of the set direction of the special sheet for the sheet feeding tray and the error of the image 180° rotating setting can be prevented, resulting in preventing increased costs for forming the image, caused by a number of error images formed on the relatively expensive pre-printed special sheets and reducing the waste of resources.

In addition, the special sheet set information is set for the plurality of sheet feeding trays and stored in the non-volatile memory. Therefore, in the case where the information is set only once, since the user only selects the sheet feeding tray directly or indirectly, thereby making the user's setting operation easy to prevent the error of the set direction of the special sheet for the sheet feeding trays. Here, 'indirect selection' means that the user sets the conditions as described in the step S51. In this case, the controller 40 determines the sheet feeding tray on the basis of the conditions.

Furthermore, a general user cannot easily determine the special sheet set condition for the sheet feeding tray and the direction of the image formed on the special sheet without receiving any instructions. However, since the relation between the special set condition and the direction forming the image is provided to the user through the graphic user interface, the user can easily and accurately set them.

Note that the special sheet set information may be satisfied with the indication of the set condition for the sheet feeding tray for the special sheet. However, for example, in FIG. 31, it may not indicate the image 113A of the sheet feeding tray but indicate the direction of the special sheet for the sheet feed direction and the direction of the image to be formed on the special sheet.

Moreover, although the case where the modes of the double-sided printing and the single-sided printing is mixed in a single printing job has been described in the fourth embodiment, the present invention is applicable to the case where only executes the single-sided printing, without inserting the dummy page, in a single printing job.

Figure 39:
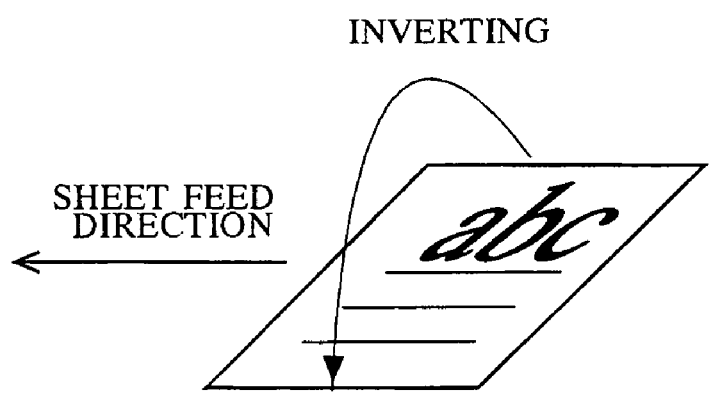
FIG. 39 is an illustration showing a cause for arising a technical problem of the present invention.
Figure 39:

Furthermore, although the case where the special sheet is a transverse transfer has been described in the fourth embodiment, and the reversing in FIG. 39 is determined in the direction of the image to be formed, the invention is also applicable to the longitudinal transfer of the special sheet where it is not determined only by the sheet feed direction of the sheet.

In addition, although the case where the post-processing-edge of the special sheet is the front end of the sheet feed direction has been described in the fourth embodiment, since the post-processing-edge can be the rear end of the post-processing-edge depending on the sheet post-processing apparatus, the present invention is not limited to the case where the post-processing-edge is the front end of the sheet feed direction.

In addition, although the case where only the special sheet is fed has been described in the fourth embodiment, it may be acceptable to the configuration to feed a plurality of kinds of sheets in a single job of the image forming by designation of sheet feeding trays for special sheets and sheet feeding trays for normal sheets. In this case, the image rotates by 180° for the normal sheet likewise with the case of the special sheet in order to arrange the upper and lower of the image to the other page. Although in the case of forming the image only on the simplex page in the normal sheet, etc., the image may be formed only on the simplex page without adding the dummy page.

In addition, although the case where the number of sheet feeding trays is two trays as a preferred example has been described in the fourth embodiment, an acceptable configuration of the invention may form the feed tray as one tray and change the setting of the set condition for the special sheet to the sheet feeding tray, depending on the image forming job.

In the first to the fourth embodiments as described above, the invention may include the following configurations.

For example, the sheet feeding tray may feed sheets by setting the stack of sheets, and the sheet feeding tray may be a sheet feed cassette or other sheet feed means.

In addition, since a display section is a relatively small in a small printer, the setting means of the present invention is not limited as comprising the GUI but may comprise any means displaying a letter or a sign.

Furthermore, the present invention is applicable to a copier and a facsimile apparatus comprising the sheet post-processing means.

Moreover, the image forming means may form an image on the sheet provided and may use an inkjet manner, etc., not limited to a laser electrostatic transfer manner.

What is claimed is:

1. An image forming apparatus comprising:
   image forming means for forming an image on a sheet fed thereto;
   sheet post-processing means for physically executing sheet post-processing on the sheet on which the image is formed by the image forming means;
   setting means for setting sheet post-processing information including: post-processing-edge identifying information identifying a post-processing-edge of the sheet with respect to a longitudinal or a transverse sheet direction; and sheet post-processing-position identifying information identifying a sheet post-processing-position on the post-processing-edge, the post-processing edge having two ends;

storage means for storing image information and the information set with the setting means; and control means for making the image forming means form the image on the sheet on the basis of the image information and the sheet post-processing information, and making the sheet post-processing means execute the sheet post-processing on the basis of the sheet post-processing information, wherein in a case where the sheet post-processing-position identifying information stored in the storage means indicates one of the two ends of the post-processing-edge, when changing the post-processing-edge to an edge adjacent to the post-processing-edge without changing a binding margin edge, the adjacent edge having the one of the two ends, the control means updates the post-processing-edge identifying information in accordance with the change and updates the sheet post-processing-position identifying information so that the sheet post-processing-position identifying information indicates the other end of the two ends of the adjacent edge, wherein the control means stores the post-processing-edge identifying information in the storage means as the sheet binding margin information before updating the post-processing-edge identifying information, and makes the image forming means form images so that the direction of each image is to be same for all the pages when sheets post-processed by the sheet post-processing means are turned-over on the basis of the sheet binding margin.

2. The apparatus according to claim 1, further comprising transport means for turning over sheets on which images are to be formed on the basis of the sheet binding margin.

3. The apparatus according to claim 1, wherein the sheet post-processing means comprises means for stapling the sheet; wherein the sheet post-processing-position identifying information indicates one among one end, two-points and the other end on the post-processing-edge, wherein the one end is the same as the other end on the neighboring post-processing-edge.

4. The apparatus according to claim 1, wherein the sheet post-processing means comprises a punching means for punching holes in the sheet; wherein the sheet post-processing-position identifying information indicates whether a punch hole exists or not.

5. The apparatus according to claim 1, wherein the setting means is for further setting sheet binding margin width information and size information of the sheet as the sheet post-processing information.

6. The apparatus according to claim 1, wherein the setting means comprises means for displaying a post-processing-edge button, a staple button and a sheet on a screen, differently displaying one edge of the sheet from the other edges to correspond the one edge to selected post-processing-edge, shifting the selected post-processing-edge whenever the post-processing-edge button is touched, shifting a staple-displaying-position on or along the selected post-processing-edge whenever the staple button is touched, and not displaying a staple when the staple button is touched after the staple-displaying-position completes a round, wherein the selected post-processing-edge corresponds to the post-processing-edge identifying information, and the staple-displaying-position corresponds to the sheet post-processing-position identifying information.

7. The apparatus according to claim 6, wherein the means for displaying further displays a punch button on the screen, toggles between displaying punched holes and no punched hole on a position corresponding to the selected post-processing-edge whenever the punch button is touched, wherein whether the punched holes exist or not on the screen corresponds to the sheet post-processing-position identifying information.

8. The apparatus according to claim 1, wherein the sheet post-processing information further comprises sheet size information; wherein the storage means has inhibition information storage means for storing edge size information regarding a length of edge of the sheet and sheet post-processing inhibiting information correspondingly; the image forming apparatus further comprises: error information outputting means; and judging means for judging whether the sheet post-processing information to be set with the setting means indicates a sheet post-processing inhibition with reference to the inhibition information storage means, and for making the error information outputting means output error information when judging that the sheet post-processing is inhibited.

9. The apparatus according to claim 8, wherein in the case of judging that the sheet post-processing is inhibited, when the sheet post-processing-position identifying information indicates one end of the both ends of the post-processing-edge, the judging means judges whether sheet post-processing information regarding a second post-processing-edge adjacent to the post-processing-edge indicates the sheet post-processing inhibition with reference to the inhibition information storage means and, in a case of judging that the sheet post-processing regarding the second post-processing-edge is not inhibited, cancels the judgment of the sheet post-processing inhibition by judging that the errors can be automatically removed.

10. The apparatus according to claim 9, wherein the image forming apparatus further comprises sheet post-processing information updating means for, in a first case where the judging means has canceled the judgment of the sheet post-processing inhibition before the setting is fixed by the setting means, updating the post-processing-edge identifying information by rotating the post-processing-edge towards the one end by 90° substantially with respect to the center of the sheet, the control means updates the post-processing-edge identifying information corresponding to the 90° rotation and updating the sheet post-processing-position identifying information so that the sheet post-processing-position identifying information indicates the other end of the both ends of the post-processing-edge.

11. The apparatus according to claim 10, wherein, not in the first case but in a case where the sheet post-processing-position identifying information indicates one end of the both ends of the post-processing-edge, when rotating the post-processing-edge towards the one end by 90° substantially with respect to the center of the sheet, the sheet post-processing information updating means updates the post-processing-edge identifying information in accordance with the 90° rotation and updates the sheet post-processing-position identifying information so that the sheet post-processing-position identifying information indicates the other end of the both ends of the post-processing-edge.

12. The apparatus according to claim 8, wherein the setting means determines the sheet post-processing-position identifying information in completion with the post-processing-edge substantially viewed from the center of the sheet so that the sheet post-processing-position identifying information does not depend on the post-processing-edge identifying information.

13. The apparatus according to claim 8, wherein the setting means comprises: an input means; a display means; and a display control means for displaying a sheet on the screen of the display means, displaying the selected post-processing-edge on the sheet and the sheet post-processing-position on or along the selected post-processing-edge according to the operation of the input means, and setting the sheet post-processing information corresponding to the display; wherein the display control means makes the sheet post-processing-position be not shown on the screen in the case where the judging means indicates the sheet post-processing inhibition.

14. The apparatus according to claim 13, wherein the control means stores the post-processing-edge identifying information in the storage means as the sheet binding margin information before updating the post-processing-edge identifying information, and makes the image forming means form images so that the direction of each image is to be same for all the pages when sheets-post-processed by the sheet post-processing means are turned-over on the basis of the sheet binding margin.

15. The apparatus according to claim 13, wherein the sheet post-processing means comprises a stapling means for stapling the sheet; wherein the sheet post-processing-position identifying information indicates one end, two-points and the other end on the post-processing-edge, wherein the one end is the same as the other end on the neighboring post-processing-edge.

16. The apparatus according to claim 13, wherein the sheet post-processing means comprises a punching means for punching a hole in the sheet; wherein the sheet post-processing-position identifying information indicates whether a punch hole exists or not.

17. The apparatus according to claim 13, wherein the setting means is for further setting sheet binding margin width information.

18. The apparatus according to claim 13, wherein the setting means comprises means for displaying a post-processing-edge button, a staple button and a sheet on a screen, differently displaying one edge of the sheet from the other edges to correspond the one edge to selected post-processing-edge, shifting the selected post-processing-edge whenever the post-processing-edge button is touched, shifting a staple-displaying-position on or along the selected post-processing-edge whenever the staple button is touched, and not displaying a staple when the staple button is touched after the staple-displaying-position completes a round, wherein the selected post-processing-edge corresponds to the post-processing-edge identifying information, and the staple-displaying-position corresponds to the sheet post-processing-position identifying information.

19. The apparatus according to claim 18, wherein the means for displaying further displays a punch button on the screen, toggles between displaying punch holes and no punch hole on a position corresponding to the selected post-processing-edge whenever the punch button is touched, wherein whether the punch holes exist or not on the screen corresponds to the sheet post-processing-position identifying information.

20. The apparatus according to claim 1, wherein the setting means is for setting the sheet post-processing information further including sheet identifying information for identifying a size and a direction of the sheet in a single image-forming job with a plurality of sheet sizes; the storage means has inhibition information storage means for storing edge size information regarding an edge length of sheet and sheet post-processing inhibiting information correspondingly; and, the image forming apparatus further comprises: error information outputting means; and judging means for, with reference to the inhibition information storage means, judging whether the sheet post-processing information to be set with the setting means indicates the sheet post-processing inhibition, and for making the error information outputting means output an error information in a case of judging that the sheet post-processing is inhibited in regard to one of a plurality of the sheet sizes; even though the lengths of edges has no equal size between the plurality of sheet sizes, the control means makes the image forming means form the image on the sheet on the basis of the provided image information and the sheet post-processing information, and makes the image forming means not form an image on the sheet in a case where the error information indicates the sheet post-processing inhibition.

21. The apparatus according to claim 20, wherein the setting means is for selecting corresponding edges of the sheets together as the post-processing-edges, and for selecting sheet post-processings of same kinds corresponding to the respective post-processing-edges, together.

22. The apparatus according to claim 21, wherein the setting means comprises: display means; input means; and display control means for making the display means display sheet images of the plurality of sheet sizes with overlapping so that the selected post-processing-edges are approximately on the same line and so that the centers of the selected post-processing-edges are located approximately on the same point, and for making the selected post-processing-edge or the contents of the sheet post-processing for the selected post-processing-edge change in accordance with input from the input means.

23. The apparatus according to claim 22, wherein the setting means comprises means for displaying a post-processing-edge button, a sheet post-processing button, and the sheet image on a screen, differently displaying one edge of the sheet from the other edges to correspond the one edge to the selected post-processing-edge, shifting the selected post-processing-edge to a neighboring edge of one end side whenever the post-processing-edge button is touched, and regularly shifting the contents of the sheet post-processing along the selected post-processing-edge whenever the sheet post-processing button is touched, wherein the selected post-processing-edge corresponds to the post-processing-edge identifying information, and the staple-displaying-position corresponds to the sheet post-processing-position identifying information.

24. The apparatus according to claim 20, wherein the control means changes the image information before forming image on the basis of the image information and the post-processing-edge identifying information set with the setting means so that the directions of images are to be the same for all pages when the sheets post-processed by the sheet post-processing means are turned-over.

25. The apparatus according to claim 1, wherein the setting means is for selectively designating the post-processing-edge or a sheet binding margin position of the sheet, or for designating both the post-processing-edge and the sheet binding margin position; the image forming apparatus further comprises: sheet turning-over direction determining means for determining a sheet turning-over direction of a plurality of sheets, on which images corresponding to the image information stored in the storage means are to be formed, on the basis of designation with the setting means; and image information changing means for changing the image information stored in the storage means so that an image formed on the back side of the sheet is rotated by 180° when a sheet turning-over direction is perpendicular to a sheet feed direction.

26. The apparatus according to claim 25, wherein the sheet turning-over direction determining means determines the sheet turning-over direction on the basis of the sheet binding margin position when the sheet binding margin position is designated by the setting means, and determines the sheet turning-over direction on the basis of the post-processing-edge when the sheet binding margin position is not designated but the post-processing-edge is designated with the setting means.

27. The apparatus according to claim 26, wherein the setting means is for further designating the sheet post-processing-position along the designated post-processing-edge, wherein the sheet turning-over direction determining means determines the sheet turning-over direction on the basis of the post-processing-edge, even if the sheet binding margin position is designated with the setting means, in a case where the sheet post-processing-position uniquely determines the sheet turning-over direction and where it is judged that the sheet post-processing can be executed.

28. The apparatus according to claim 27, wherein the setting means is for further designates kinds of the sheet post-processing along the designated post-processing-edge, wherein the sheet turning-over direction determining means determines whether the sheet post-processing can be executed on the basis of the post-processing-edge, the sheet post-processing-position, and a kind of the sheet post-processing which are designated with the setting means, and a sheet size included in the image information.

29. The apparatus according to claim 27, wherein the setting means comprises: input means; display means; and display control means for making the display means display a sheet on the screen of the display means, display the designated post-processing-edge on the sheet and the sheet post-processing-position on or along the designated post-processing-edge according to operation of the input means, and for setting information corresponding to the display.

30. The apparatus according to claim 1, wherein the setting means is for further setting sheet feed information, wherein the control means makes the image forming means form the image on the sheet on the basis of the sheet feed information, too, wherein the sheet feed information includes special-sheet set information substantially indicating set state of special-sheets on a sheet feeding tray, the special-sheets having been pre-processed so that a direction of image to be formed is designated, the image forming apparatus further comprises: a sheet feeding tray where sheets are stacked; sheet transporting means for transporting a sheet from the sheet feeding tray to the image forming means, and for transporting and discharging the sheet on which an image is formed by the image forming means; and image information changing means for, when the sheet feeding tray where the special sheets are stacked is used, determining whether the direction of an image included in the image information is rotated by 180° on the basis of the special sheet set information, and for changing the image information on the basis of the determination.

31. The apparatus according to claim 30, wherein a plurality of the sheet feeding trays are provided, the special-sheet set information is set with the setting means, for one or more of the plurality of sheet feeding trays.

32. The apparatus according to claim 30, wherein the setting means comprises: display means for displaying a plurality of illustrations each indicating a set state of special sheets on a sheet feeding tray; input means for selecting one of the illustrations for each sheet feeding tray for special sheets; and storage means for storing the information selected with the input means.

33. The apparatus according to claim 32, wherein a predetermined edge of the special sheet is a front end of the sheet feed direction, wherein the directions of images are perpendicular to the sheet feed direction.

34. The apparatus according to claim 33, wherein the predetermined edge is the post-processing-edge which is physically processed after the image is formed by the image forming means.

35. The apparatus according to claim 33, wherein the control means, in a case where one of the two illustrations is selected, make the image forming means form an image on a special sheet without rotating the image, and in a case where the other of the two illustrations is selected, rotates an image by 180° and make the image forming means form the rotated image on a special sheet.

36. The apparatus according to claim 1, wherein the storage means further stores sheet post-processing inhibiting information in regard to sheet size information,
further comprising setting error removing means which includes:
first judging means for judging whether the sheet post-processing information set by the setting means matches with a piece of the sheet post-processing inhibiting information;
second judging means for, if the first judging means has judged as a match, judging whether the mach can be removed by both changing the sheet post-processing-edge identifying information so as to indicate an edge adjacent to the post-processing-edge stored in the storage means, and changing the sheet post-processing-position information so as to indicate the other end of the both ends of the post-processing-edge stored in the storage means; and
changing means for, if the second judging means has judged as being able to be removed, performing the both changes and changing a sheet feeding tray of one sheet-direction to a sheet feeding tray of the other sheet-direction.

* * * * *